US011406152B2

(12) United States Patent
Venkata Jagannadha Rao

(10) Patent No.: US 11,406,152 B2
(45) Date of Patent: Aug. 9, 2022

(54) INTEGRATED SMART HELMET AND METHODS AND SYSTEMS OF CONTROLLING SMART HELMET

(71) Applicant: Anirudha Surabhi Venkata Jagannadha Rao, Secunderabad (IN)

(72) Inventor: Anirudha Surabhi Venkata Jagannadha Rao, Secunderabad (IN)

(73) Assignee: Anirudha Surabhi Venkata Jagnnadha Rao, Secunderabad (IN)

( * ) Notice: Subject to any disclaimer, the term of this patent is extended or adjusted under 35 U.S.C. 154(b) by 0 days.

(21) Appl. No.: 16/961,318

(22) PCT Filed: Apr. 25, 2019

(86) PCT No.: PCT/IB2019/053406
§ 371 (c)(1),
(2) Date: Jul. 10, 2020

(87) PCT Pub. No.: WO2020/217089
PCT Pub. Date: Oct. 29, 2020

(65) Prior Publication Data
US 2022/0047028 A1 Feb. 17, 2022

(51) Int. Cl.
*A42B 3/04* (2006.01)
*H04W 4/90* (2018.01)
*G01S 19/17* (2010.01)
*H04B 1/3827* (2015.01)
*H04W 76/14* (2018.01)
*B62J 43/30* (2020.01)
*B62K 23/02* (2006.01)

(52) U.S. Cl.
CPC ............ *A42B 3/046* (2013.01); *G01S 19/17* (2013.01); *H04B 1/385* (2013.01); *H04W 4/90* (2018.02); *B62J 43/30* (2020.02); *B62K 23/02* (2013.01); *H04B 2001/3866* (2013.01); *H04W 76/14* (2018.02)

(58) Field of Classification Search
CPC ........ A42B 3/046; H04W 4/90; H04W 76/14; G01S 19/17; H04B 1/385; B62J 43/30; B62K 23/02
See application file for complete search history.

(56) References Cited

U.S. PATENT DOCUMENTS

| | | | |
|---|---|---|---|
| 9,247,779 B1* | 2/2016 | Aloumanis | G08G 1/167 |
| 2003/0071766 A1* | 4/2003 | Hartwell | A42B 3/30 |
| | | | 345/8 |
| 2016/0044276 A1* | 2/2016 | Shearman | A61B 5/14553 |
| | | | 348/207.1 |

* cited by examiner

*Primary Examiner* — Ted M Wang
(74) *Attorney, Agent, or Firm* — Anirudha Surabhi Venkata Jagnnadha Rao

(57) ABSTRACT

Exemplary embodiments of the present disclosure are directed towards an integrated smart helmet system, comprising: a control unit-PCB 201 is wirelessly connected to a computing device 303 over network 305, computing device 303 is configured to enable a user to use different functionalities without having to remove helmet 102 and access the computing device 303 and the control unit-PCB 201 is configured to detect crashes while wearing the helmet 102 by the user and notify crash detected information to computing device 303 over network 305, buttons 213a-213d are positioned at the rear or side of helmet 102 and control unit-PCB 201 is electrically coupled to buttons 213a-213d, buttons 213a-213d are configured to initiate prompts to direct the user to put away the computing device 303 while driving and disable certain dangerous functions.

10 Claims, 17 Drawing Sheets

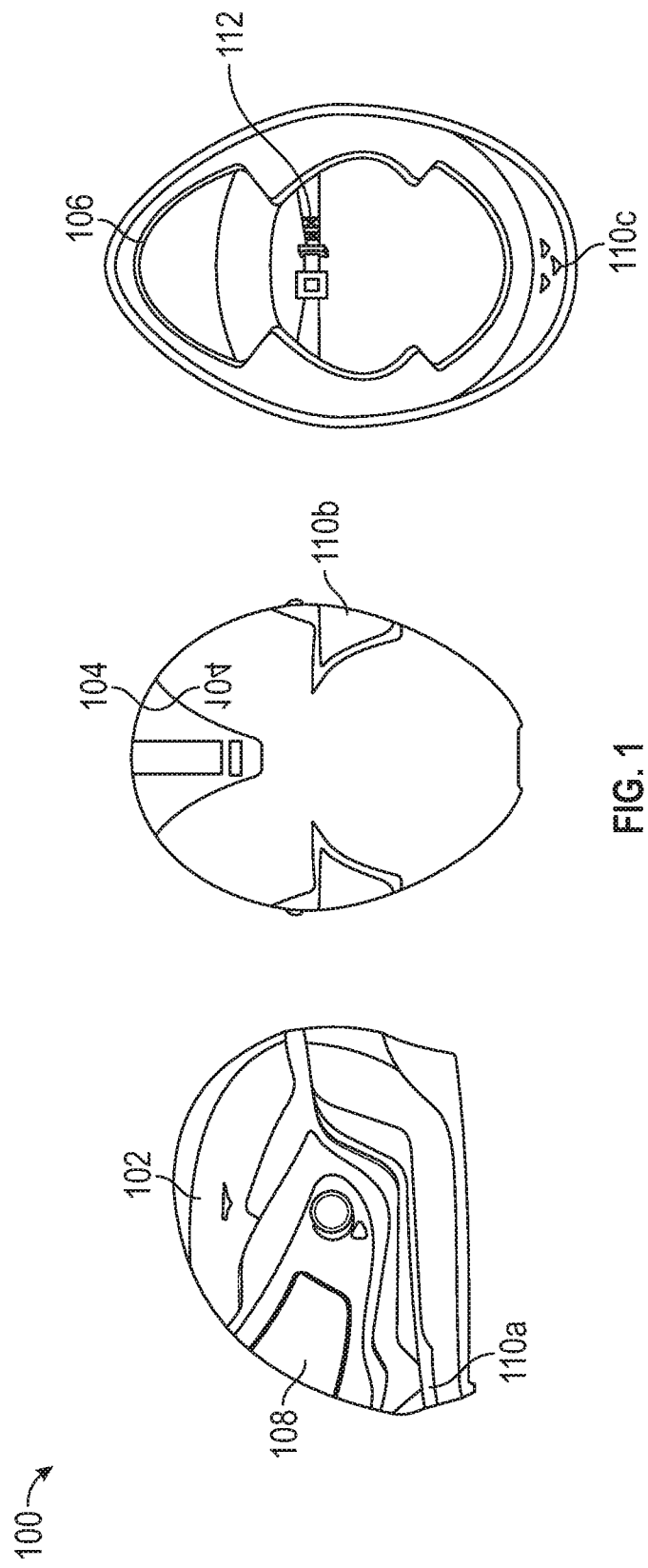

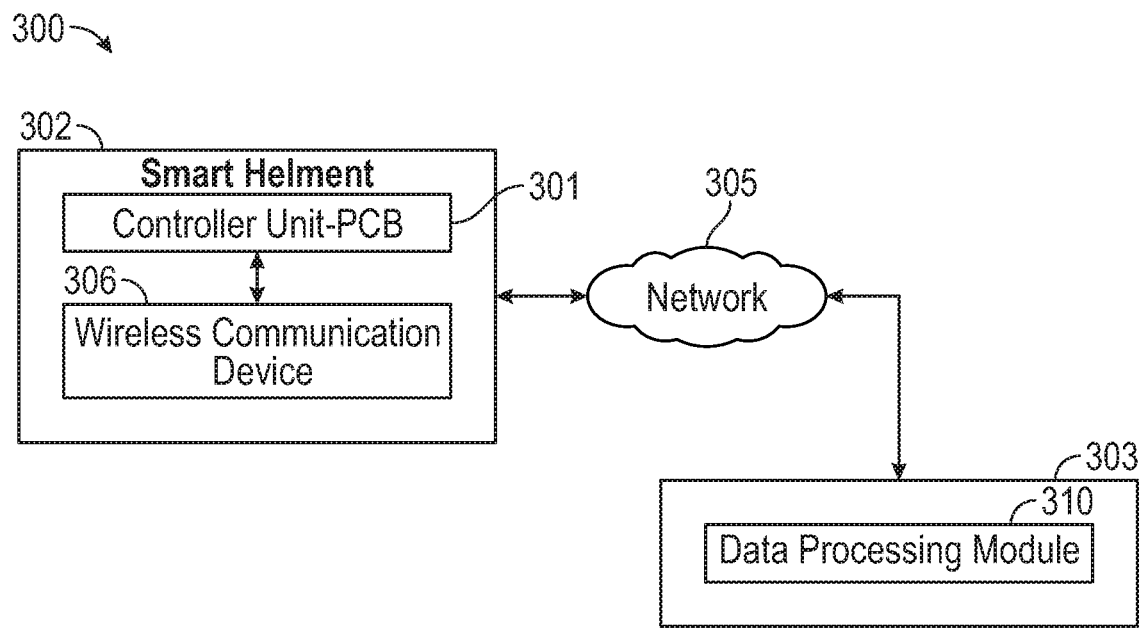
FIG. 3
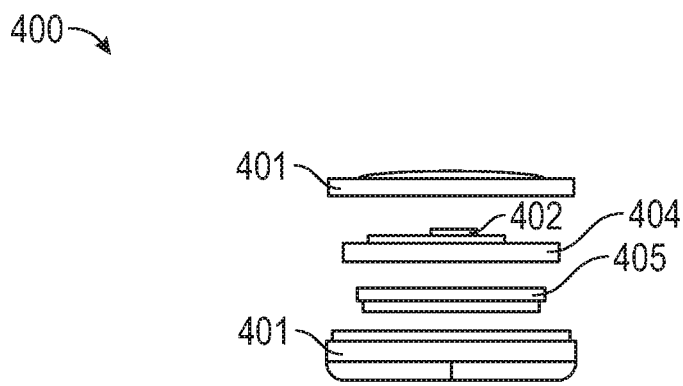
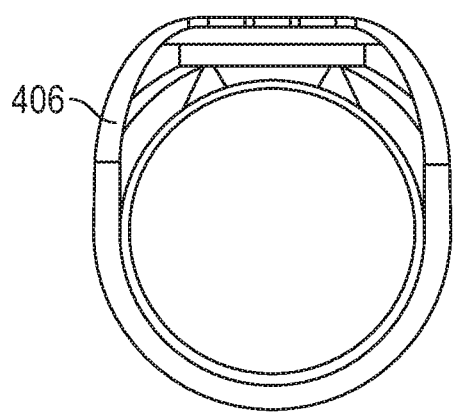
FIG. 4

INTEGRATED SMART HELMET AND METHODS AND SYSTEMS OF CONTROLLING SMART HELMET

TECHNICAL FIELD

The present disclosure generally relates to the field of helmet systems and technology, and more particularly to a smart helmet that has integrated electronics and systems which actively monitors a user's environment and provides various kinds of information to the user.

More particularly, the present disclosure relates to a combination of a helmet, and a controller, and a mobile phone device application, with enhanced features, including but not limited to:
 a. built-in LED turn signals;
 b. positive audible feedback for the signals;
 c. fully integrated Bluetooth and phone communication system;
 d. hands-free cellular communications;
 e. fully integrated headphone and microphone;
 f. gyroscope sensor;
 g. ultrasonic radar sensor;
 h. accelerometer;
 i. helmet remote;
 j. processing system for helmet;
 k. crash detection systems;
 l. Concussion detection;
 m. Rise-to-wake;
 n. mobile phone application;
 o. SOS alert systems;
 p. Intelligent maps with weather integration;
 q. Big data computation and analysis;
 r. a secure method of securing the helmet to a vehicle when parked.

BACKGROUND

Helmets and other protective headgear have evolved over the years. It is not uncommon for individuals to wear protective headgear when they are, for example, riding motorcycles, riding horses, roller-blading, playing football, playing baseball, playing hockey, skiing and skating, as well as for other general safety purposes.

Helmets have the primary function of protecting the head of a person from an injury that may be sustained while engaged in work, sports and other activities. Moreover, as outdoor activities, have increased in popularity, the need emerged for even more specialized helmets. For example, as cycling and motorcycling have grown in popularity, so has the injuries resulting from accidents involving cycling or motorcycling. It is estimated that more than 100000 people per year are admitted to hospital because of head related injuries. Similarly, helmets are used across several industries, such as construction, oil and gas, power plants, water, transportation, shipbuilding, aerospace and defense.

Helmets are meant to safeguard user's but user habits compromise the safety of helmets. The unsafe practices include disregard of a user to wear a helmet, non-strapping of helmets, using worn out helmets, using mobile phones or other communication devices while riding, turning of the user's head to check for obstacles thereby obstructing the field of view. There are currently many intelligent helmet systems that address one or many of these issues, but fail to address all of them.

There are independent wireless communication modules available in market that can be attached to the helmets for using devices like mobile phones while riding. However, these devices are bulky and leave loose wires hanging around the helmet making them inconvenient and non-aesthetic. Furthermore, the weight from these external devices can affect the natural head tilt and response time of the user. The helmet systems with integrated wireless communication modules that are currently available are exorbitantly priced.

Also, the helmet manufactures realize protective helmets can incorporate other safety features such as two-way and AM/FM radios, turn signals, rearview mirrors and other safety devices. Protective helmets with two-way communication systems are generally well known. Some of these well-known systems carry a transmitting unit within the helmet, but have the disadvantage of using an umbilical cord to a base unit. Such a unit is not a complete and self-contained system. Other known units have an external antenna, are not protected from shock, and provide earphones which may completely cover the ear. Still other known units do not provide a proper cushioning for the electronics itself. Consequently, the electronics may be damaged from impact to the helmet.

There are helmet systems that use cameras and image processing techniques to visualise objects present in the field of view of user's (eg: Skully helmets). However, these helmets involve a lot of processing due to use of image processing cameras and hence are costlier. Also these helmets (Skully) have display screens in the visors, which might distract the driver from driving and can be intrusive and unsafe.

Helmets having integrated electronics have been utilized for some time in work place and recreational settings. One such device has been invented by Kawaguchi et al. as disclosed in U.S. Pat. No. 4,648,131. This helmet is for intercommunications between workers as well as between a central control room and other workers.

The invention disclosed in U.S. Pat. No. 4,833,726 to Shinoda et al. teaches a helmet with two-way radio communication facilities to be used by workers in the construction industry.

The invention disclosed in U.S. Pat. No. 5,353,008 to Eikenberry et al. teaches a motorcycle helmet with brake lights including a duty cycled receiver circuit for receiving a radio frequency signal from a transmitter located on the motorcycle.

U.S. Pat. No. 3,586,977 to Lustig et al. discloses voice communications between a motorcycle user and passenger when both are wearing motorcycle helmets.

However, the helmets described in the prior art are passive and fail to be responsive to the user's environment.

By integrating all the aforementioned features, a helmet provides extra level of security in case of emergency. By integrating navigation and communications, as well as gyroscopes and accelerometers into the helmet system, the amount of extra equipment a user is required to purchase, carry, and access is significantly reduced.

In the light of aforementioned discussion, there exists a need for a cost effective helmet system that enhances the safety and convenience of user's. The present invention discloses a smart helmet system that can be controlled wirelessly by an external controller, and which can detect crashes through gyroscopic sensors and accelerometers and can initiate emergency response triggered in conjunction with a software application. The use of multiple sensors involves less processing, low cost and simple circuitry and the use of sensory output modules such as LED output modules makes the system non-intrusive and safe, when compared to helmets with embedded displays. In an embodiment, the helmet systems disclosed herein are integrated with the wireless communication device and proprietary chip in the helmet, and further integrated with an application on smartphones and thus allowing the users to use the different functionalities of their devices without having to remove their helmets or access their computing device.

BRIEF SUMMARY

The following presents a simplified summary of the disclosure in order to provide a basic understanding to the reader. This summary is not an extensive overview of the disclosure and it does not identify key/critical elements of the disclosure or delineate the scope of the disclosure. Its sole purpose is to present some concepts disclosed herein in a simplified form as a prelude to the more detailed description that is presented later.

An objective of the present disclosure is directed towards providing a smart helmet system and a system of controlling the helmet. The present invention comprises a helmet having a battery-operated controller unit-PCB. According to an illustrative embodiment, the helmet may comprises of a full-face helmet, or an open face helmet, with fully integrated wireless communication system, speakers and microphones. In order to power the system, a box/housing consisting of unique circuitry and processors, housed within a rectangle-shaped housing that can be attached or detached into a hollow housing in the rear of helmet at the base of the motorcyclist's skull. This is facilitated by a plastic detachable housing which can be detached from the helmet to allow remote re-charging. Upon clipping the housing into the helmet, contact points are established via the use of a Magnetic connector or pogo pins. This unique battery mounting position puts the centre of mass of the helmet as close as possible to the base of the neck so that, despite the mass of the housing, the helmet provides little inertial resistance to quick movements of the head. The system has the chip integrated into the shell of the helmet.

An objective of the present disclosure is directed towards providing a helmet further comprising a three axis digital gyroscope mounted in the housing which produces and records data which can be used to calculate where the user is looking at any given point of time by referencing it to the relative mean head position of the user. When combined with the accelerometer, the system can detect the exact "x,y,z" location of a helmet and the angle relative to its riding position. In the event of a rapid deceleration possibly indicating an accident, provides an algorithm that will contact emergency responders if the user is nonresponsive. The smart helmet system leverages the accelerometer in the computing device to cross check and verify the crash detected by the helmet. If both sensors don't register the same deceleration upon impact, the app can establish that it was just the helmet which suffered the impact by falling off the table, etc. The helmet further includes ultrasonic sensors which are placed at blind spot detection angles and are configured to scan and report if any object/vehicle is in the user's blind spot. Once there is an obstruction, an immediate sensory feedback is sent to the user via Led/vibration/etc. This enables the user to navigate the lanes on the road without having to take their eyes off the road. The helmet further comprises of an accelerometer, which will be used to gather data which can ascertain the acceleration/deceleration of the user and any sudden impacts to the helmet and user. This data is collected and can be factored into a series of protocols for crash detection.

An objective of the present disclosure is directed towards providing a protocol for crash detection by cross referencing readings of the gyroscopes in the helmet system and the computing device of a user.

An objective of the present disclosure is directed towards providing a data processing module that computes and stores data from the helmet system by leveraging the processing power of the user's computing device, thereby reducing the need for placing batteries in the helmet, resulting in a lighter and safer helmet system.

An objective of the present disclosure is directed towards providing a method and system for detecting, monitoring and/or controlling one or more of mobile services for a user's mobile device, and when the device is being used and the vehicle, operated by the user of the device, is moving. The present method and system determines whether the vehicle is being operated by a user that may also have access to a mobile communication device which, if used concurrently while the vehicle is in operation, may lead to unsafe operation of the vehicle. The present disclosure provides an algorithm to determine that a vehicle operator has potentially unsafe access to a mobile communication device by using the light sensor on the front of the computing device to sense if the user has the computing device out of his pocket for example. This combined with the speed of the user (calculated via movement on a mobile application) and the usage of buttons and user experience design can prompt the user to put away the computing device while driving and disable certain dangerous functions, or may restrict operator access to one or more services that would otherwise be available to the operator via the computing device.

An objective of the present disclosure is directed towards providing a method and system for activating and initiating an emergency distress protocol/signal highlighting the user's exact geographical location to emergency services, personal and public contacts.

An objective of the present disclosure is directed towards providing a method and system for activating and initiating an emergency distress protocol/signal by which the smart helmet system automatically begins recording and keeping a log of all the data which it receives so that this data can later be used in case of an enquiry, thereby acting as a deterrent for potential offenders.

An objective of the present disclosure is directed towards providing a method and algorithm to match the route of the user to the predictive weather data. Furthermore, the algorithm may be used to predict the weather during the entire ride rather than just at the beginning or at present. This would help user's be better prepared while doing longer activities where weather conditions could change with geographical locations. Map data is also used for Geo-locating the user during SOS and crash Protocols.

It is understood that this Summary section is neither intended to be, nor should be, construed as being representative of the full extent and scope of the present disclosure. Additional benefits, features and embodiments of the present disclosure are set forth in the attached figures and in the description herein below. Accordingly, this Summary section may not contain all the aspects and embodiments described herein.

Additionally, the disclosure herein is not meant to be limiting or restrictive in any manner. Moreover, the present disclosure is intended to provide an understanding to those of ordinary skill in the art of one or more representative embodiments supporting the disclosure. Moreover, the present disclosure is intended to encompass and include obvious improvements and modifications of the present disclosure.

According to an exemplary aspect, an integrated smart helmet system comprising a control unit-PCB is wirelessly connected to a computing device over a network, the computing device is configured to enable a user to use different functionalities without having to remove a helmet and access the computing device and the control unit-PCB is configured to detect crashes while wearing the helmet by the user and notify the crash detected information to the computing device over the network.

According to another exemplary aspect, the integrated smart helmet system comprising buttons positioned at the rear or side of the helmet and the control unit-PCB is electrically coupled to the buttons, the buttons are configured to initiate prompts to direct the user to put away the computing device while driving and also disable certain dangerous functions.

According to another exemplary aspect, the first speaker is positioned on the left side of the helmet and a second speaker is positioned on the right side of the helmet, the first speaker and the second speaker are configured to initiate an audio prompt to the user.

BRIEF DESCRIPTION OF DRAWINGS

Other objects and advantages of the present invention will become apparent to those skilled in the art upon reading the following detailed description of the preferred embodiments, in conjunction with the accompanying drawings, wherein like reference numerals have been used to designate like elements, and wherein:

Other objects and advantages of the present invention will become apparent to those skilled in the art upon reading the following detailed description of the preferred embodiments, in conjunction with the accompanying drawings, wherein like reference numerals have been used to designate like elements, and wherein:

FIG. 1 shows the diagrammatic representation of the top view (a), front view (b), side view (c) and rear view (d) of the helmet system, in accordance with a non limiting exemplary embodiment of the present disclosure.

FIG. 3 is a block diagram depicting the smart helmet and a computing device, according to exemplary embodiments of the present disclosure.

FIG. 4 shows the diagrammatic representation of the top view (a), front view (b), side view (c) and rear view (d) of the remote of the helmet system, in accordance with a non-limiting exemplary embodiment of the present disclosure.

DETAILED DESCRIPTION

Figure 2A:
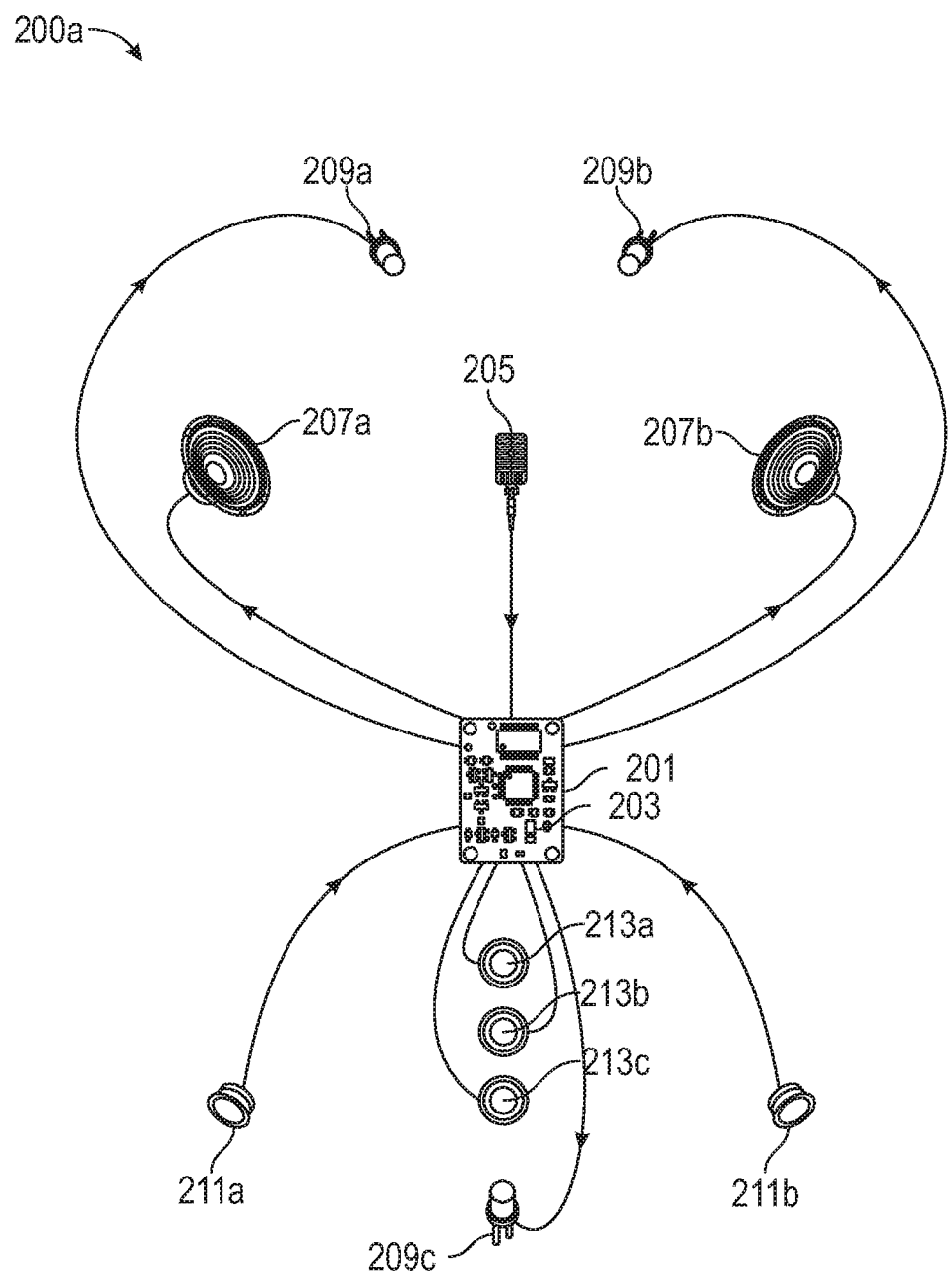
FIG. 2A represents a functional block diagram of the interior of the helmet system, its circuitry and components, in accordance with a non-limiting exemplary embodiment of the present disclosure.

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting.

The use of "including", "comprising" or "having" and variations thereof herein is meant to encompass the items listed thereafter and equivalents thereof as well as additional items. The terms "a" and "an" herein do not denote a limitation of quantity, but rather denote the presence of at least one of the referenced item. Further, the use of terms "first", "second", and "third", and the like, herein do not denote any order, quantity, or importance, but rather are used to distinguish one element from another.

The drawing figures are intended to illustrate the general manner of construction and are not necessarily to scale. In the detailed description and in the drawing figures, specific illustrative examples are shown and herein described in detail. It should be understood, however, that the drawing figures and detailed description are not intended to limit the invention to the particular form disclosed, but are merely illustrative and intended to teach one of ordinary skill how to make and/or use the invention claimed herein and for setting forth the best mode for carrying out the invention.

In accordance with various non limiting exemplary embodiments of the present subject matter, helmet systems and methods are disclosed wherein the helmet systems are integrated with wireless communication devices connecting the helmet system with devices such as mobile phones and thus allowing the user's to use the different functionalities of their devices without having to remove their helmets every time.

With reference to the drawing figures and in particular FIG. 1 there is shown a helmet system 100 incorporating features of the present invention. The helmet system 100 depicting a side view of the helmet 102, a top view of the helmet 104, and a bottom view of the helmet 106. Although helmet 102, 104, 106 is depicted as a motorcycle helmet, a helmet incorporating features of the present invention may be implemented as a bicycle helmet, industrial safety helmet, military or other helmet without departing from the scope of the invention. Helmet 102, 104, 106 is preferably constructed of conventional materials with an inner liner formed of expanded polystyrene or polypropylene foam (EPS) and an outer shell made from a homogeneous plastic such as polyamide, polyethylene or polycarbonate, or from a composite material such as fiberglass, aramid, carbon fiber or other composites. The helmet 102, 104, 106 includes a visor 108, vents 110a, 110b, 110c, and a strap 112. The visor 108 is typically opaque and shield the face from the sun. Such visor 108 is typically permanently fixed to the helmet 102, 104, 106 and is unmovable i.e., it is not intended to be removed by the user. The vents 110a, 110b, 110c are located in various positions designed to enhance air flow and/or to reduce air resistance. The strap 112 having a first strap portion and a second strap portion selectively connectable to one another to extend from opposing sides of the body and underneath a chin of the user. The user may include any person or object that requires wearing of a helmet, and which may include, but not limited to, a rider, a player in a team, a soldier, and so forth.

Referring to FIG. 2A, there is a depiction of the interior of the helmet system 200a, its circuitry and components, according to exemplary embodiments of the present disclosure. The components include a controller unit-PCB 201, a wireless communication device 203, a microphone 205, two speakers 207a, 207b positioned on the left side and right side of the user's head, front output LED lights 209a, 209b, rear output LED light 209c, ultrasonic sensors 211a, 211b, buttons 213a, 213b, 213c, gyroscope sensors 215, and accelerometers 219. The helmet will be controlled with 4 buttons 213a, 213b, 213c, 213d (not shown) positioned at the rear or on the side of the helmet, which can be accessed easily by the user. The gyroscope sensors 215 is configured to produce data which can be used to calculate where the user is looking at any given point of time once we have the relative mean head position. This combined with the accelerometer 219 can give us the exact x,y,z location of a helmet and the angle relative to its riding position. The Ultrasonic sensors 211a, 211b are placed at Blind spot detection angles and are configured to scan and report if any object/vehicle is in the user's blind spot. Once there is an obstruction, there will be an immediate sensory feedback to the user via Led/vibration/etc. This enables the user to navigate the lanes on the road without having to take your eyes off the road. The accelerometer 219 will be used to gather data which can be used to collect the acceleration/deceleration of the user and any sudden impacts to the helmet and in turn the user. This data will then be factored into a series of protocols for crash detection.

In accordance with one or more exemplary embodiments, the smart helmet provides a crash detection feature to the user. The smart helmet detects any blow to the head while the user wears the smart helmet. Whenever the user has a crash while wearing the smart helmet, it is automatically detected by the controller unit-PCB 201 and notifies this information to the emergency contacts. This shares the exact location of the user after the crash is detected. The controller unit-PCB 201 initiates the protocol and the data processing module (not shown) on the computing device (not shown) sends location-based notifications to the preassigned emergency contacts. The location-based notifications may include, but not limited to, SMS, Email, alerts, and so forth. The smart helmet communicates to the data processing module (not shown) via the network (not shown). The smart helmet may know when you have accidentally dropped your helmet or when you are involved in a fatal crash. This is done by a proprietary algorithm and code which cross references the impact information and location of the user with the GPS movements and speed of the user on the computing device (not shown) and classifies whether the user is driving or not. If the data generated by the accelerometer 219 on the computing device (not shown) shows a change in location and motion, the data processing module (not shown) authenticates this and relays this information to the data processing module (not shown). This helps in distinguishing if the user had a real crash or he just dropped his smart helmet. The smart helmet is also capable of working with different types of head injuries. The head injuries may include, but not limited to, head-on injury, rotational injury, and so forth. When the user has rotational head movement during a crash, the smart helmet calculates the angular velocity and the rotational angles of the head and when they cross the threshold limit then the crash detection protocol is activated. When the user has a crash the smart helmet calculates the impact detected from the accelerometer 219, the angular velocity, and head position by the gyroscope and the linear acceleration from the GPS. By combining this information the head position and the impact from the head-on and rotational collision, the smart helmet may classify whether the user has possibly suffered a concussion or a high impact on the head. After the concussion is detected, we can inform this to the emergency services as well as people monitoring this data, for eg: the coach or medic of a sports team.

In accordance with one or more exemplary embodiments, the smart helmet provides SOS feature. SOS is a safety feature, which when triggered, may notify the real-time, live location to the selected contacts that may be pre-assigned. This auto enables a live location tracking after the SOS function is triggered and updates the contacts with a live map of where the user is moving. It also sends location-based notifications to the preassigned emergency contracts via different communication modes (such as SMS and an Email) with the exact location to the preassigned Emergency Contacts. This feature can also be used as a simple live location tracker. The SOS feature may be activated from the smart helmet or directly from the data processing module (not shown). Triggering from the smart helmet may be done with a triple tap of the button on the helmet or triple tap on the helmet itself to activate the SOS (this feature may be activated by the accelerometer detecting a tap on the surface of the smart helmet).

In accordance with one or more exemplary embodiments, the smart helmet with rise to wake technology may detect the motion of the helmet in a sleep state and may activate the smart helmet to wake up to an active state. This is done by the accelerometer interrupt function that would send an interrupt when it detects significant motion, which in turn can also classify if a user has picked up the helmet or not. After it goes to the activate state, it starts advertising for the user's computing device (not shown) to connect. This ensures that the smart helmet is ready to start pairing to the user's computing device as soon as it is picked up. Once the user disconnects the computing device (not shown) from the smart helmet, the smart helmet may go back to the sleep state after a timeout period.

In accordance with one or more exemplary embodiments, the smart helmet with inertial measurement unit configured to measure how the head is rotating when the user puts on the smart helmet. The smart helmet may track the angles at which the head is positioned and give the absolute orientation of the head. The smart helmet system also measures the angular velocity of the head and may be mapped to real time head movement. The inertial measurement unit is multi-axis combination of gyroscope 215 and accelerometer 219. The smart helmet may further be configured to measure the absolute orientation by getting the quaternions of the helmet in real time. The data is sent over to the server from the smart helmet for processing and storing data. The smart helmet is coupled with the computing device (not shown) and the data processing module (not shown) for visualizing and analyzing the data. Visualizations include the real time head movement with 3D object files with the data from the remote sensor. The smart helmet needs to communicate the data from the sensor for visualizing the data. The data may be sent over the data processing module (not shown) via the network (not shown). For example, the smart helmet implemented with wireless low energy communication, then it can be mainly used for a single user at a time approach. Wireless low energy is known to consume very less energy and an ideal choice for a single user approach. The data from the smart helmet may be streamed via L2CAP profile to the paired computing device (not shown). The data processing module (not shown) may process this information and then have the dashboard for visualizing the real time head movements, the angular velocity at which head is moving, Quaternion data with angles of head rotation. The data processing module (not shown) can also classify on the data for any predefined gestures or movements. In another example, the smart helmet implemented with WiFi based communication protocols may work for any single user at a given time or multiple users in a group. The smart helmet may act as UDP client whilst the UDP server streams the data. The data is used for real time head tracking, visualizing real time head movements, angles, and positions. The server (not shown) may be connected to the data processing module (not shown) that has the user interface built for respective sport or activities. The interface may provide all the vital information with respect to the sport that involves helmet and need for tracking the head.

In accordance with one or more exemplary embodiments, real time player analysis is done using the wireless sensors placed inside the smart helmet of the player that provide all the vital information. The wireless sensors consist of IMU (Inertial Measurement Unit), GPS (Global positioning System), and impact detection system (Impact accelerometer) and on board WiFi chip. The wireless sensors are responsible for capturing the real time data from the IMU, GPS, Impact detection system and send them wirelessly to the computing device (not shown) or a cloud computer or a local server (not shown) for processing the data and streaming it to the smart computing device (not shown) or data processing module (not shown) with UI respective to the sport. IMU is responsible for the head tracking done on the player for real time. The IMU calculates the absolute orientation, angular velocity and any tap gestures on the smart helmet. GPS is responsible for calculating the absolute position of the player on the pitch, calculating speed and linear acceleration of the player on the pitch. Impact Detection System is responsible for measuring any high impacts on the helmet, detecting rapid changes in acceleration, linear acceleration and deceleration. On board WiFi is responsible for streaming this real time data to the cloud computer (not shown) of local server that can process the data and infer information about the player. The data may extract from this system, which is Player Position, Player current speed, Player heat map, Impact and hit detection, Head tracking and orientation, Gesture recognition, Player top speed, Player average distance covered, Concussion detection, and image about how sensor systems collect the information.

In accordance with one or more exemplary embodiments, the real time analysis is a fleet of connected wireless sensors with the users that are part of the team. The wireless systems are all connected to the same network. The wireless sensors may talk to the computing device (not shown) that can process data and also it can communicate among other wireless sensors. The connected wireless systems consist of IMU, GPS, impact accelerometer, and on board WiFi. The fleet of wireless systems when connected to the same network will share any information from any other node in the network (not shown). This helps in calculating all the users and synchronizing the data to form a collective information for the team. The GPS could effectively show the position of each user in an area, that is constantly updating with each movement. Practice session monitoring is also done using the real time team analysis. This works by first setting up the system with feed of users, positions and unique id of their wireless sensor system. For example, the practice session monitoring mode allows coaches to predefine any formation of strategy and observe in real time how the players are performing with the help of the data processing module (not shown) which is connected to the computing device (not shown).

In accordance with one or more exemplary embodiments, the smart helmet with the entertainment system integrated seamlessly into it can be used for listening music, making and taking calls, and activating the personal assistants (Ski or Google assistant, for e.g.). The Entertainment System is also equipped with onboard battery, Usb Micro-B port for charging and software upgrade. The entertainment system does this by having onboard wireless communication device connecting to the computing device with the HFP (Hands Free Profile) and AVRCP (Audio/Video Remote Control Profile). The smart helmet also provides a device firmware upgrade feature through USB Micro-B Port which is accompanied by the data processing module that detects the smart helmet when connected in a firmware upgrade state. The System comes equipped with buttons for changing different modes. The Entertainment system has mainly 3 modes, which are pairing mode, active mode, DFU mode, and so forth. Pairing Mode: The Entertainment system can go into pairing mode for it to be available for nearby devices to connect.

Active Mode: The Entertainment system in active mode is connected to a nearby wireless communication device with the AVRCP and HFP profiles and is used to listen music, take and receive calls.

DFU Mode: DFU Mode is primarily used for updating firmware of the Entertainment system inside the smart helmet. Firmware of the system can be updated by connecting the smart helmet to the computing device and going to the DFU Mode.

Figure 2B:
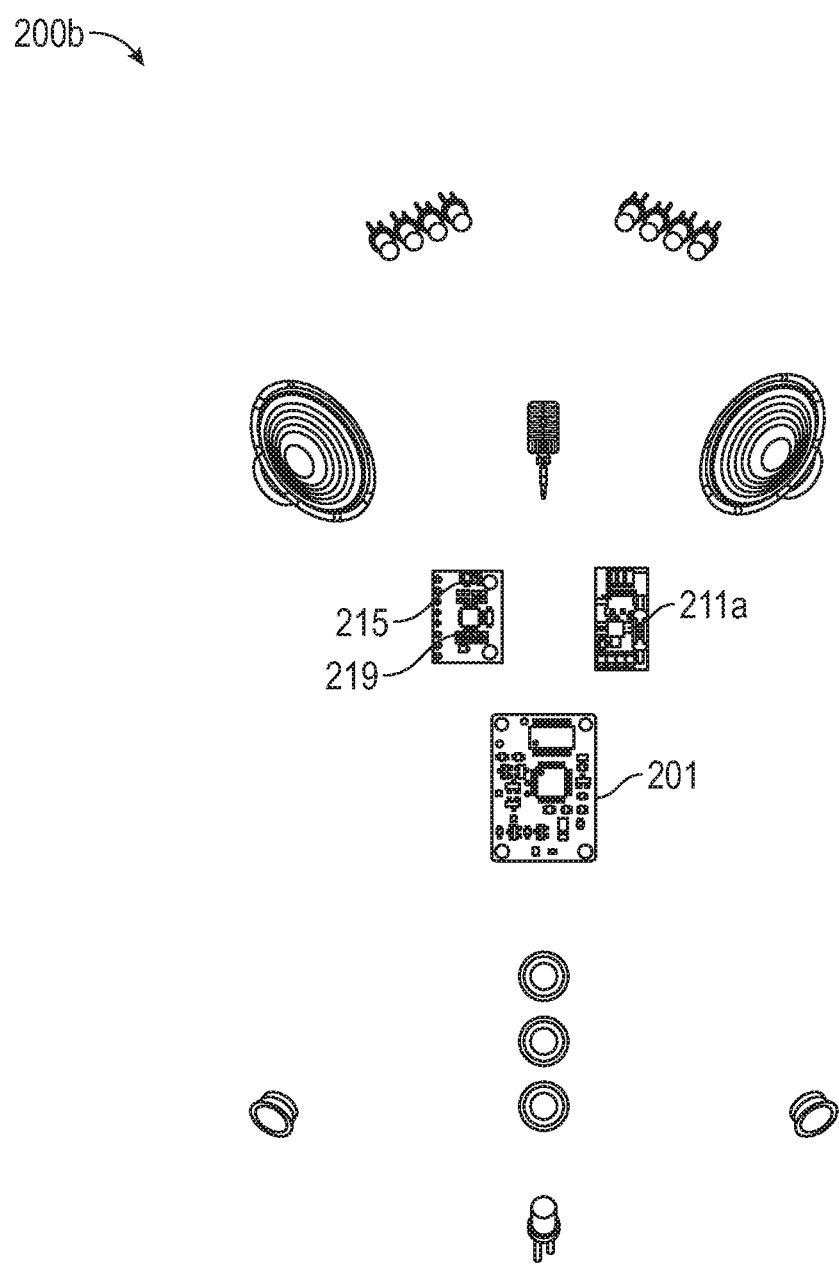
FIG. 2B shows the diagrammatic representation of the top view (a), front view (b), side view (c) and rear view (d) of the controller module (the brain) of the helmet system, in accordance with a non-limiting exemplary embodiment of the present disclosure.

Referring to FIG. 2B, it is a depiction of the controller unit-PCB 201 of the smart helmet system 200b. It comprises of a plastic detachable housing which can be detached from the helmet to allow remote re charging. Upon clipping the housing into the helmet, contact points are established via the use of a Magnetic connector or pogo pins. The unit-PCB 201 and a battery may be fixed into the helmet using screws.

Referring to FIG. 3 is a block diagram 300 depicting the smart helmet and a computing device, according to exemplary embodiments of the present disclosure. The smart helmet 302 is wirelessly communicated with the computing device 303 over a network 305. The smart helmet 302 comprises a controller unit-PCB 301, and a wireless communication device 306. The computing device 303 is configured to enable the user to use different functionalities without having to remove the smart helmet 302 and access the computing device 303 and the controller unit-PCB 301 is configured to detect crashes while wearing the smart helmet 302 by the user and notify the crash detected information to the computing device 303 over the network 305. Network 305 may include, but is not limited to, a short range wireless communication network, such as near field communication network, Bluetooth low energy network, cellular network, an Ethernet, a wireless local area network (WLAN), or a wide area network (WAN), a Wi-Fi communication network e.g., the wireless high-speed internet, or a combination of networks, a cellular service such as a 4G (e.g., LTE, mobile WIMAX) or 5G cellular data service. Network 305 may provide for transmission of data and/or information via a control protocol, hypertext transfer protocol, simple object access protocol or any other internet communication protocol. The wireless communication device 306 is configured to transmit and receive the information via the network 305. The computing device 303 comprises a data processing module 310 configured to compute and store data from the smart helmet 302 by leveraging the processing power of the user's computing device 303. The term "module" is used broadly herein and refers generally to a software or hardware or firmware program resident in memory of the computing device 303. The computing device 303 corresponds to mobile devices (e.g., mobile phones, tablets, etc.), and the applications (e.g. the data processing module 310) accessed are mobile applications, software that offers the functionality of accessing mobile applications, and viewing/processing of interactive pages, for example, is implemented in the computing device 303 as will be apparent to one skilled in the relevant arts by reading the disclosure provided herein.

Referring to FIG. 4, it is a depiction of the remote/trigger of the smart helmet system 400. It consists of a paired remote button 402 via an RF chip circuit 404, and a battery 405 which can be placed on the handle bar (not shown) of a bike or on the wrist of the user. The remote button 402, the RF Chip circuit 404, and the battery 405 are housed in an inner casing which is held in place by a silicon outer casing 406. The silicon casing allows the unit to be strapped onto any rod/handlebar (not shown). The remote button 402, the RF Chip circuit 404, and the battery 405 are enclosed by an enclosure 401.

Figure 5:
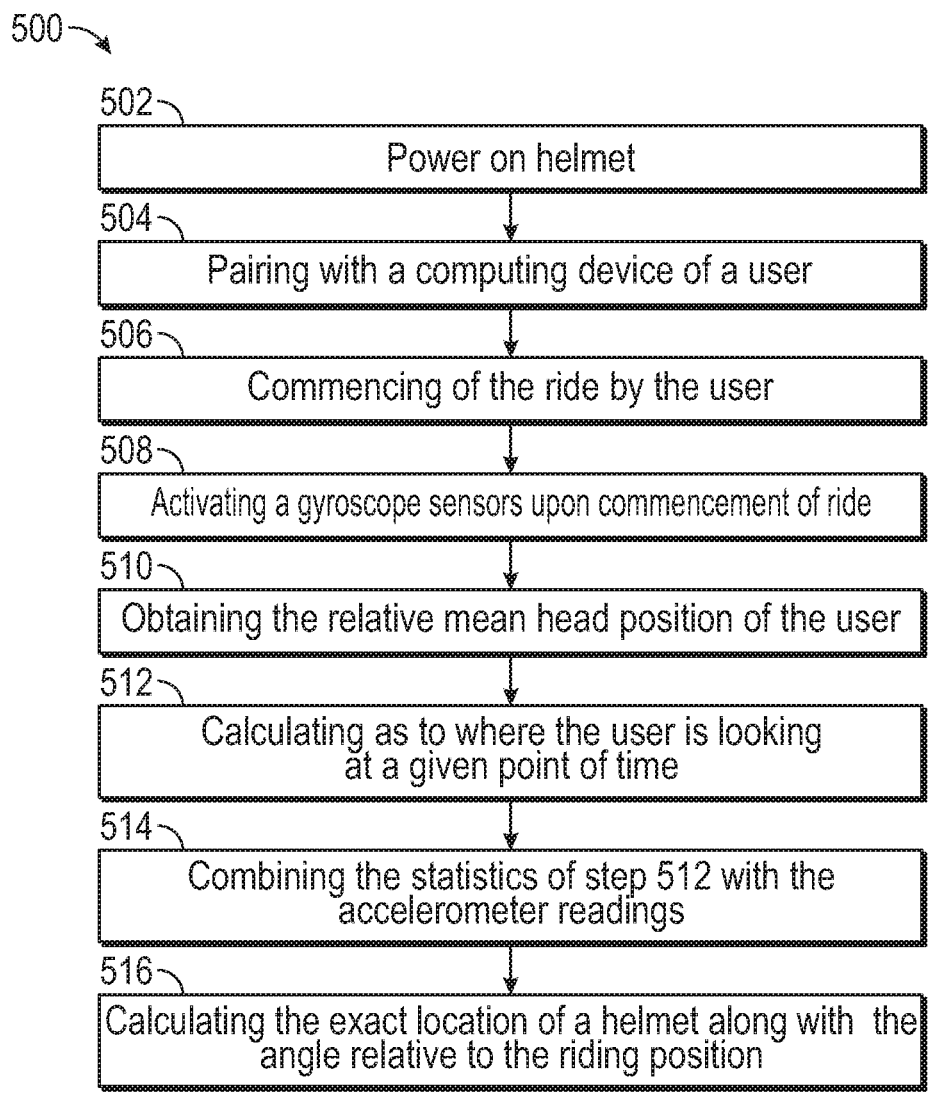
FIG. 5 is a flowchart depicting a method to detect the exact "x,y,z" location of a helmet and the angle relative to its riding position, in accordance with a non-limiting exemplary embodiment of the present disclosure.

Referring to FIG. 5, it is flowchart 500, depicting a method to detect the exact location of a helmet and the angle of a user's head relative to its riding position, according to an exemplary embodiment of the present disclosure. The method commences at step 502 where the power is on in the helmet. At step 504, the power enabled helmet is paired with the computing device of the user. Following the pairing the user commences the ride at step 506. The commencement of the ride leads to activation of gyroscope sensors at step 508. The relative mean head position of the user is obtained at step 510. At step 512, it is calculated as to where the user is looking at a given point of time. The gyroscope produces data which can be used to calculate where the user is looking at any given point of time. The statistics obtained at step 512 is combined with the accelerometer readings at step 514. The method concludes by calculating the exact location of the helmet along with the angle relative to the riding position at step 516. This can be used to calculate where the user is looking at any given point of time.

Figure 6:
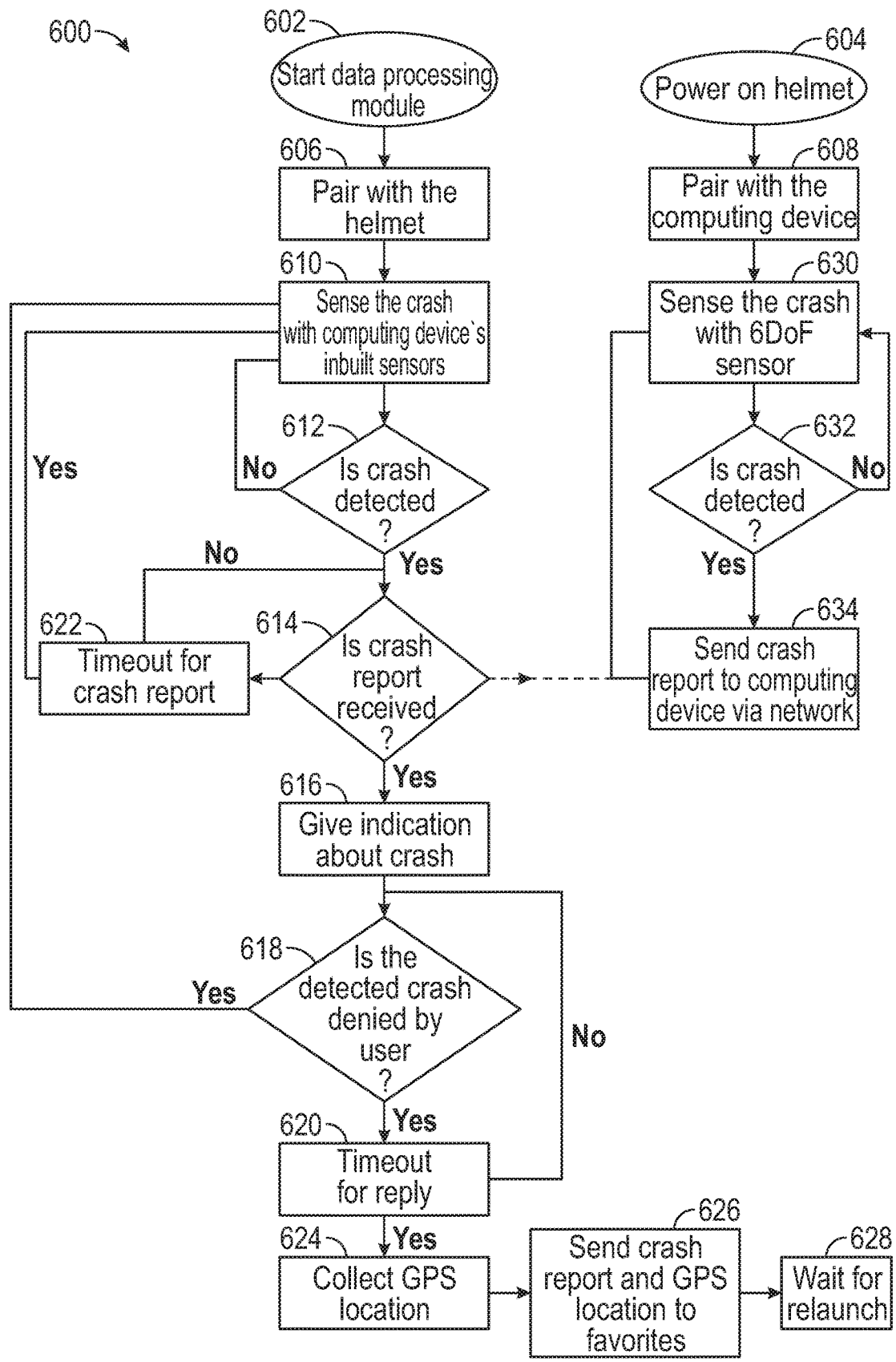
FIG. 6 is a flowchart depicting a protocol for crash detection by cross referencing readings of the gyroscopes in the helmet system and the computing device of a user, in accordance with a non-limiting exemplary embodiment of the present disclosure.

Referring to FIG. 6, it is a flowchart 600 depicting the protocol for crash detection by cross referencing readings of the gyroscopes in the helmet system and the computing device of a user. Upon sensing an impact of more than 96 G, cross checking with the data processing module and getting a specific pattern readout from the Gyroscope sensor, the helmet will start to beep and the LED will flash according to the SOS Morse code. The user has 15 seconds to deactivate the protocol. Once this has lapsed the Helmet will send a signal to the data processing module, which in turn will send out a distress beacon to the emergency contact. This beacon could be a form of communication which informs the emergency contact of the Impact force, the GPS location (obtained from the computing device's GPS chip) and the user's details. The method is in sync with data processing module of the computing device and the helmet. The data processing module is started at 602 and the helmet power is switched on at step 604. Pairing of the computing device with the helmet is done at step 606 and pairing of the helmet with computing device takes place as a consequence at step 608. At step 610 the sense of any crash taken place is done through computing device's inbuilt sensors. At step 612 it is enquired whether the crash has been detected. If the enquiry to step 612 is yes, then it is further enquired whether the crash report has been received at step 614. If the enquiry to step 614 is yes, then the crash is indicated at step 616. If the enquiry to step 612 and step 614 is no, then the timeout for crash report is noted at step 622 and the process reverts to step 610. If the enquiry to step 612 is no, then the process reverts to step 610. At step 618 it is enquired whether the detected crash has been denied by the user. If the enquiry to step 618 is yes, then timeout for reply is given at step 620 and as a second case the process reverts to step 610. If the timeout reply is no, then the process reverts to step 618. If the timeout reply is yes, then the GPS location is collected at step 624 and the crash report is sent along with the GPS location to the favourites at step 626 and at step 628 the data processing module waits for relaunch. On the other hand the helmet senses the crash with 6DoF sensors at step 630. At step 632 it is enquired whether the crash has been detected. If the enquiry to step 632 is yes, then the passive crash report is sent to the computing device via the network at step 634 (This step is connected to step 614) and the process reverts to step 630. If the enquiry to step 632 is no, then the process reverts to step 630.

Figure 7:
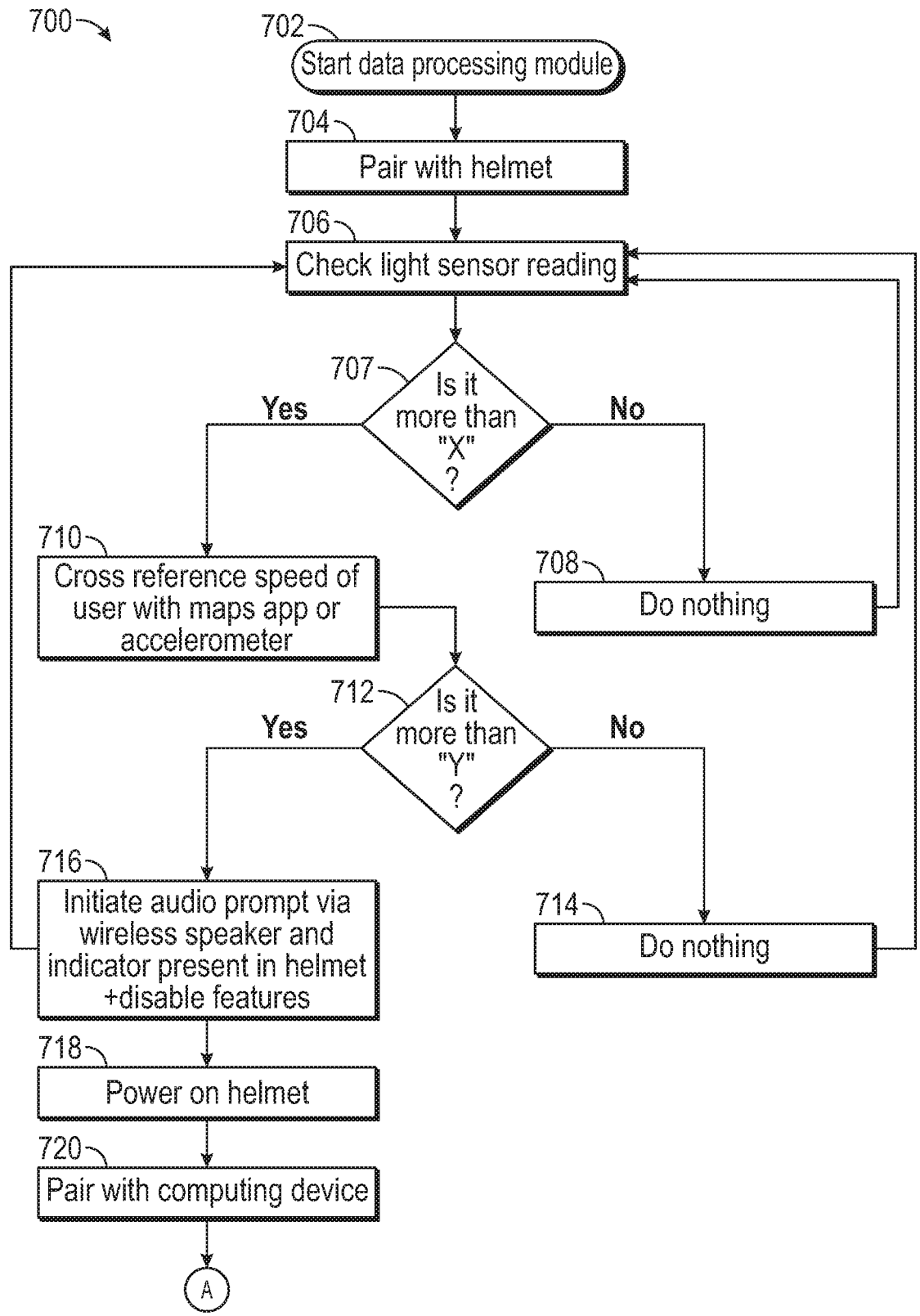
FIG. 7 is a flowchart depicting a protocol for recognition and activation of "RideSafe" mode, in accordance with a non-limiting exemplary embodiment of the present disclosure.
Figure 7:
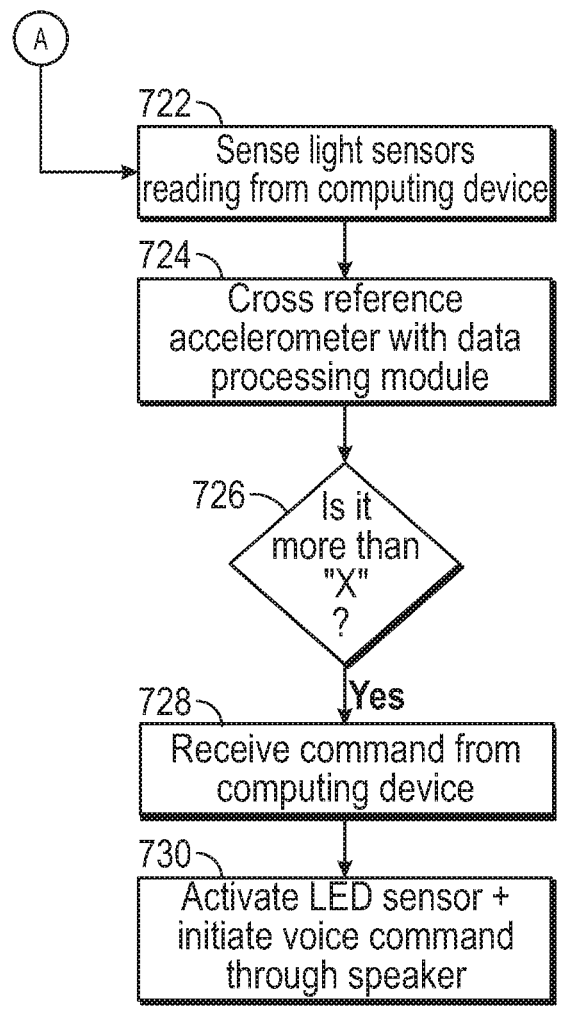

Referring to FIG. 7, it is a flowchart 700 depicting a protocol for recognition and activation of "RideSafe" mode. The method begins with the data processing module detecting whether the user is using their computing device by checking the readings on the light sensor. These readings combined with the speed of the user (calculated via movement on maps) and the usage of buttons will initiate prompts via LED indicators and/or speakers to direct the user to put away the computing device while driving and also disable certain dangerous functions. The method starts at step 702, where the data processing module is started and paired with the helmet at step 704. The light sensor reading is checked at step 706. It is enquired at step 707 whether it is more than "x". If the enquiry to step 707 is yes, then the speed of the user is cross referred with maps app or accelerometer at step 710. If the enquiry to step 707 is no, then nothing is done at step 708. At step 712 it is enquired whether the light sensor reading is more than "y". If the enquiry to step 712 is yes, then an audio prompt via wireless speaker is initiated and LED indicator present in the helmet and disable the features at step 716. If the enquiry to step 712 is no, then nothing is done at step 714. At step 718, the power of the helmet is switched on and paired with the computing device at step 720. The light sensor readings are sensed from the computing device at step 722. The accelerometer is cross referred with the data processing module at step 724. At step 726 it is enquired whether it is more than "X". If the enquiry to step 726 is yes, then a command is received from the computing device at step 728. The LED sensor is activated and a voice command is initiated through speaker at step 730 and the process reverts to step 724.

Figure 8:
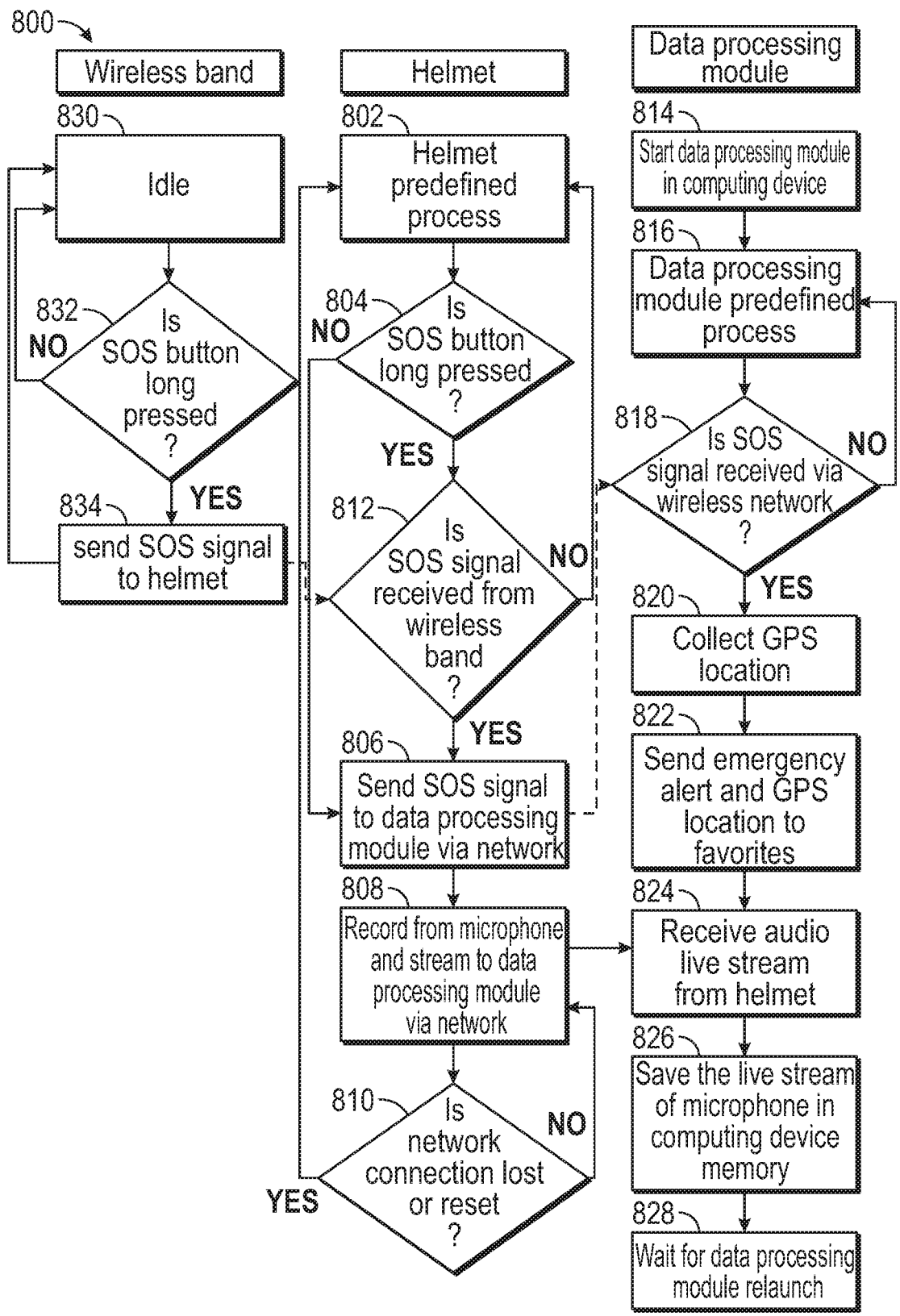
FIG. 8 is a flowchart depicting a protocol for activating and initiating an emergency distress protocol/signal by which the smart helmet system automatically begins recording and keeping a log of all the data, in accordance with a non-limiting exemplary embodiment of the present disclosure.

Referring to FIG. 8 is a flowchart 800, depicting a protocol for activating and initiating an emergency distress protocol/signal by which the smart helmet system automatically begins recording and keeping a log of all the data. The protocol may be described in synchronization of wireless band, the helmet, and the data processing module. Step 802 marks the helmet's predefined process like switching the wireless communication device on. In case of an emergency at step 804 it is enquired whether the SOS button has been long pressed. If the enquiry to step 804 is yes, then the SOS signal is sent to both the data processing module which is started at step 814 via the wireless communication device at step 806. If the enquiry to step 804 is no, then it is further enquired at step 812 whether the SOS signal has been received from a wireless band. If the enquiry to step 812 is yes, then the process continues by connecting to step 806. If the enquiry to step 812 is no, then the process reverts to step 802. The SOS signal may be recorded from the microphone and streamed to the data processing module via wireless communication device at step 808. It is enquired at step 810 whether the wireless low energy signal has been lost or reset. If the enquiry to step 810 is no, then the process reverts to step 808.

As a continuation to step 814, at step 816 the data processing module is subjected to a predefined process. At step 818 it is enquired whether the SOS signal has been received via wireless network. The step 818 is connected to step 806. If the enquiry to step 818 is yes, then the GPS location is collected at step 820. At step 822 the emergency alert and the GPS location is sent to favorite contacts who may not be limiting to, friends, family, guardians, and the like. At step 824 audio live stream is received from helmet which is saved through the microphone provided in the memory of the computing device at step 826. Steps 808 and 824 are interconnected. Further at step 828 the app may be re launched as per the requirement. The wireless band normally tends to be idle as depicted in step 830. It is enquired at step 832 whether the SOS button has been long pressed. If the enquiry to step 832 is yes, then the SOS signal is sent to the helmet at step 834. The step 834 and 812 are interconnected. If the enquiry to step 832 is no, then the process reverts to step 830.

Figure 9:
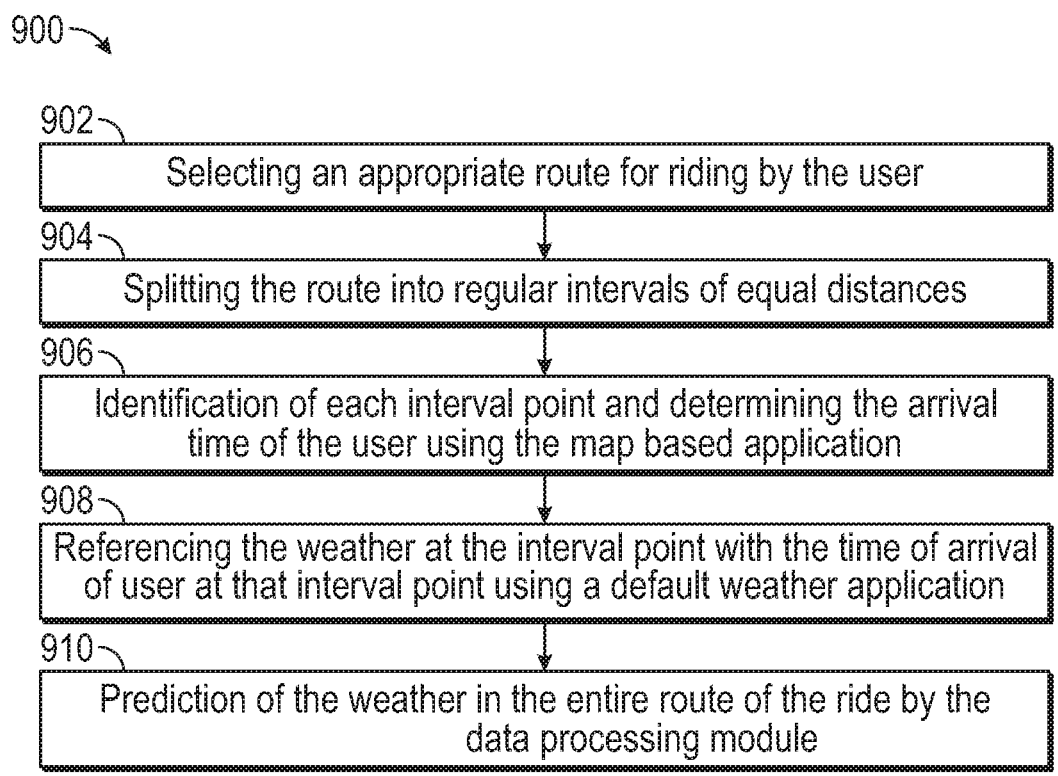
FIG. 9 is a flowchart depicting a protocol for predicting weather and identifying best routes for the user, in accordance with a non-limiting exemplary embodiment of the present disclosure.

Referring to FIG. 9 is a flowchart 900, depicting a protocol for predicting weather and identifying best routes for the user. The method begins at step 902 with the selection of an appropriate route for riding by the user. Splitting the route into regular intervals of equal distances is done at step 904. For example: Once the user selects the route from Point A to Point B, the data processing module is configured to split the route into intervals ranging between 500 meters-1 km. Therefore, if the route is 10 kilometers long, it will be split into 10 or 20 intervals. Identification of each interval point and determining the arrival time of the user using the map based application is done at step 906. At step 908 referencing the weather at the interval point with the time of arrival of user at that interval point using a default weather application is done. At step 910 the prediction of the weather in the entire route of the ride is done by the data processing module.

Figure 10:
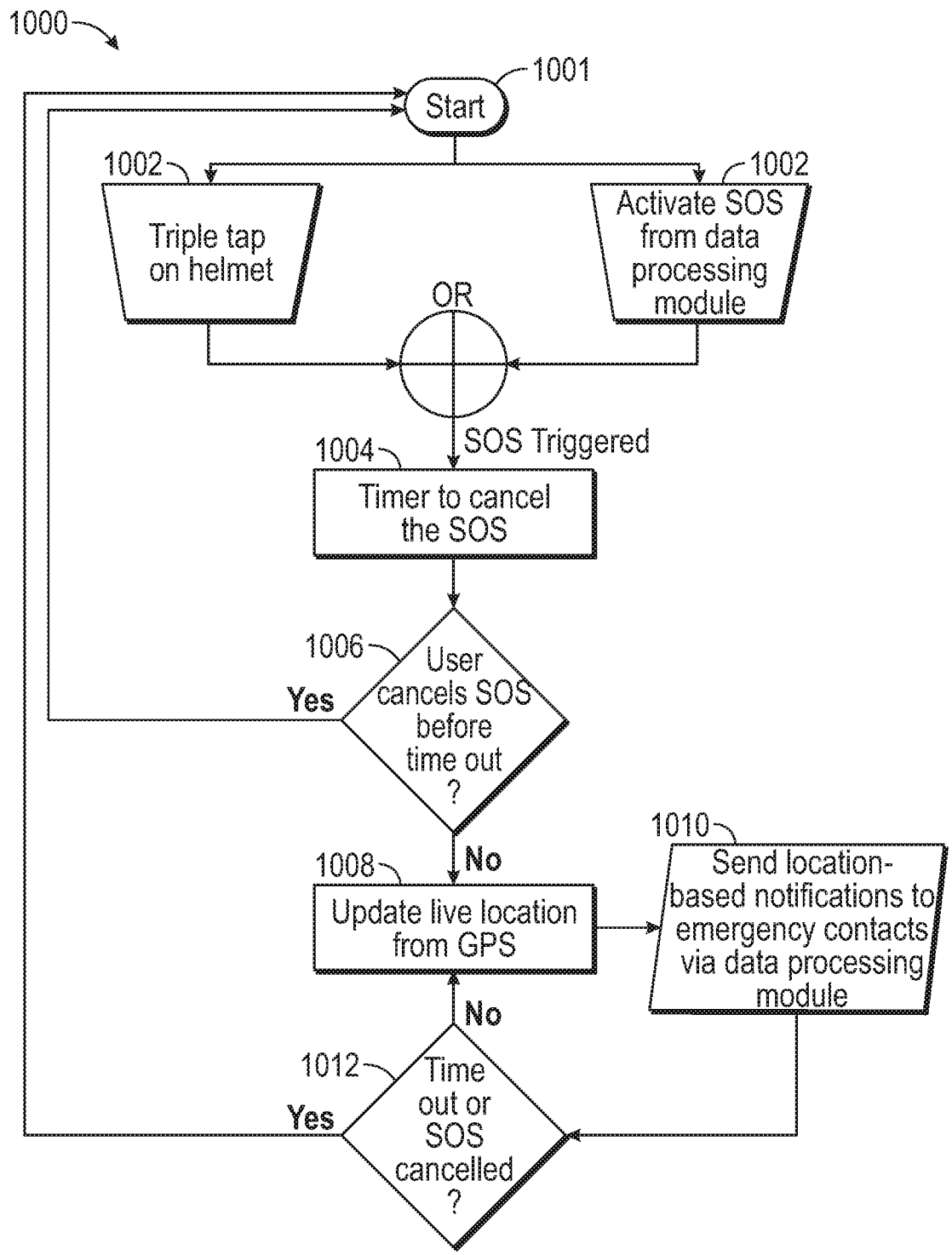
FIG. 10 is a flowchart, depicting the method for triggering the SOS, in accordance with a non-limiting exemplary embodiment of the present disclosure.

Referring to FIG. 10 is a flowchart 1000, depicting the method for triggering the SOS. The method begins at step 1001, and then at step 1002 with power on the helmet and activate SOS from the data processing module at the computing device. Allowing the user to select the timer to cancel the SOS at step 1004. It is enquired at step 1006 whether the user cancels the SOS before timeout. If the enquiry to step 1006 is yes, then the process reverts to step 1001. If the enquiry to step 1006 is no, then updating the live location from GPS at step 1008. Sending the location-based notifications to emergency contacts via the data processing module at step 1010. Here, the location-based notifications may be sent to emergency contacts via different communication modes (such as email, SMS mode, and so forth). It is enquired at step 1012 whether the timeout or SOS is cancelled. If the enquiry to step 1012 is yes, then the process reverts to step 1001. If the enquiry to step 1012 is no, then the process continues at step 1008.

Figure 11:
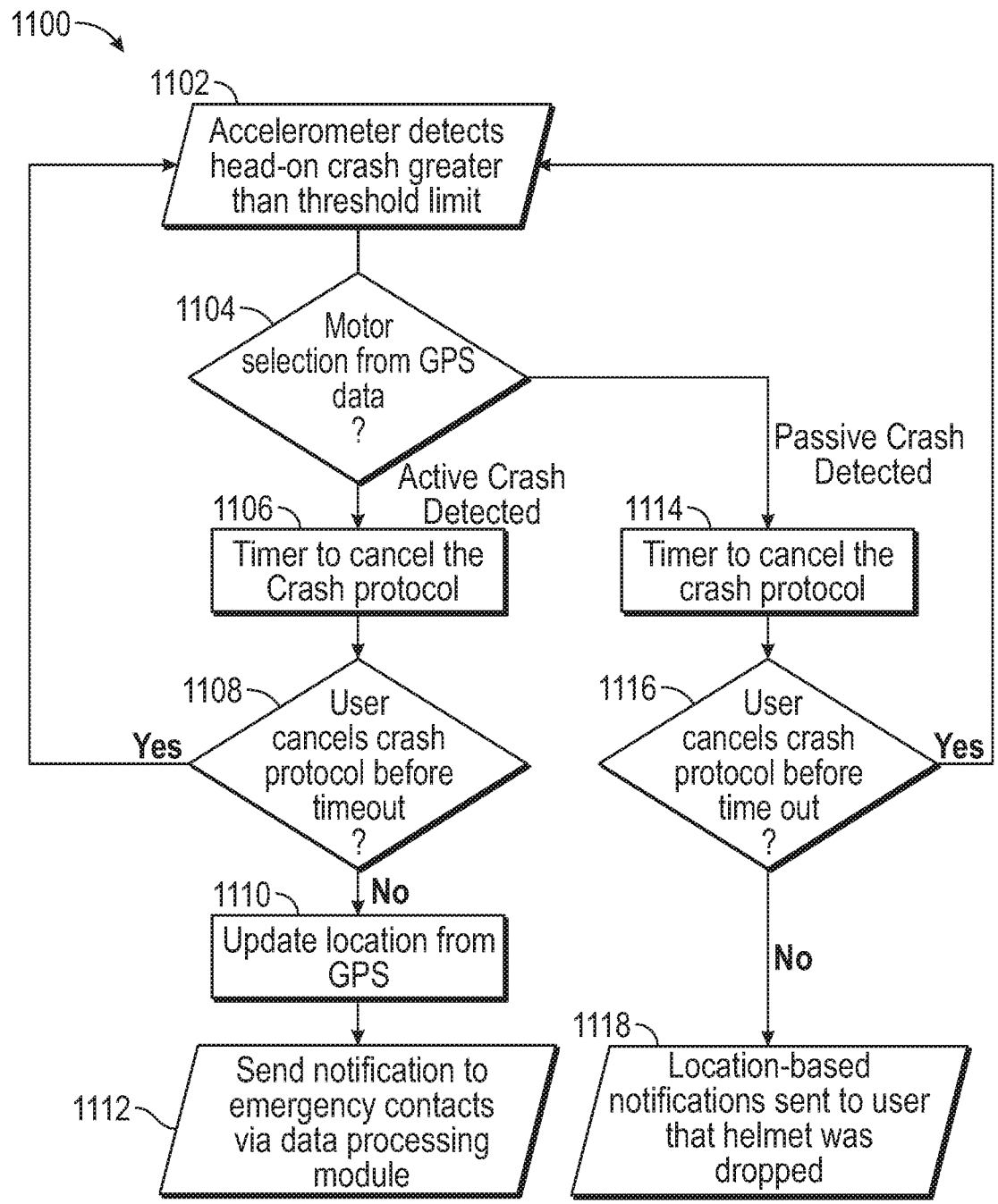
FIG. 11 is a flowchart, depicting the method for detecting head-on crash, in accordance with a non-limiting exemplary embodiment of the present disclosure.

Referring to FIG. 11 is a flowchart 1100, depicting the method for detecting head-on crash. The method begins at step 1102, where the accelerometer detects head-on crash greater than the threshold limit. It is enquired at step 1104 whether the motion detection from the GPS data is passive crash detected data or active crash detected data. If the enquiry to step 1104 is active crash detected data (when the user met with can accident), cross referencing accelerometer data readings with the data processing module at the computing device and-checks whether the user is in motion by referring to a gyroscope sensor and then allowing the user to select the timer to cancel the crash protocol 1106. Active crash means. It is enquired at step 1108 whether the user cancels crash protocol before timeout. If the enquiry to step 1108 is yes, then the process reverts to step 1102. If the enquiry to step 1108 is no, then updating the live location from GPS at step 1110. Sending the location-based notifications to emergency contacts via the data processing module at step 1112. If the enquiry to step 1104 is passive crash detected data, then the allowing the user to select the timer to cancel the crash protocol cancel 1114. Here, passive crash (user dropping helmet accidentally). It is enquired at step 1116 whether the user cancels crash protocol before timeout. If the enquiry to step 1116 is yes, then the process reverts to step 1102. If the enquiry to step 1116 is no, then sending the notification to the user that the helmet was dropped at step 1118.

Figure 12:
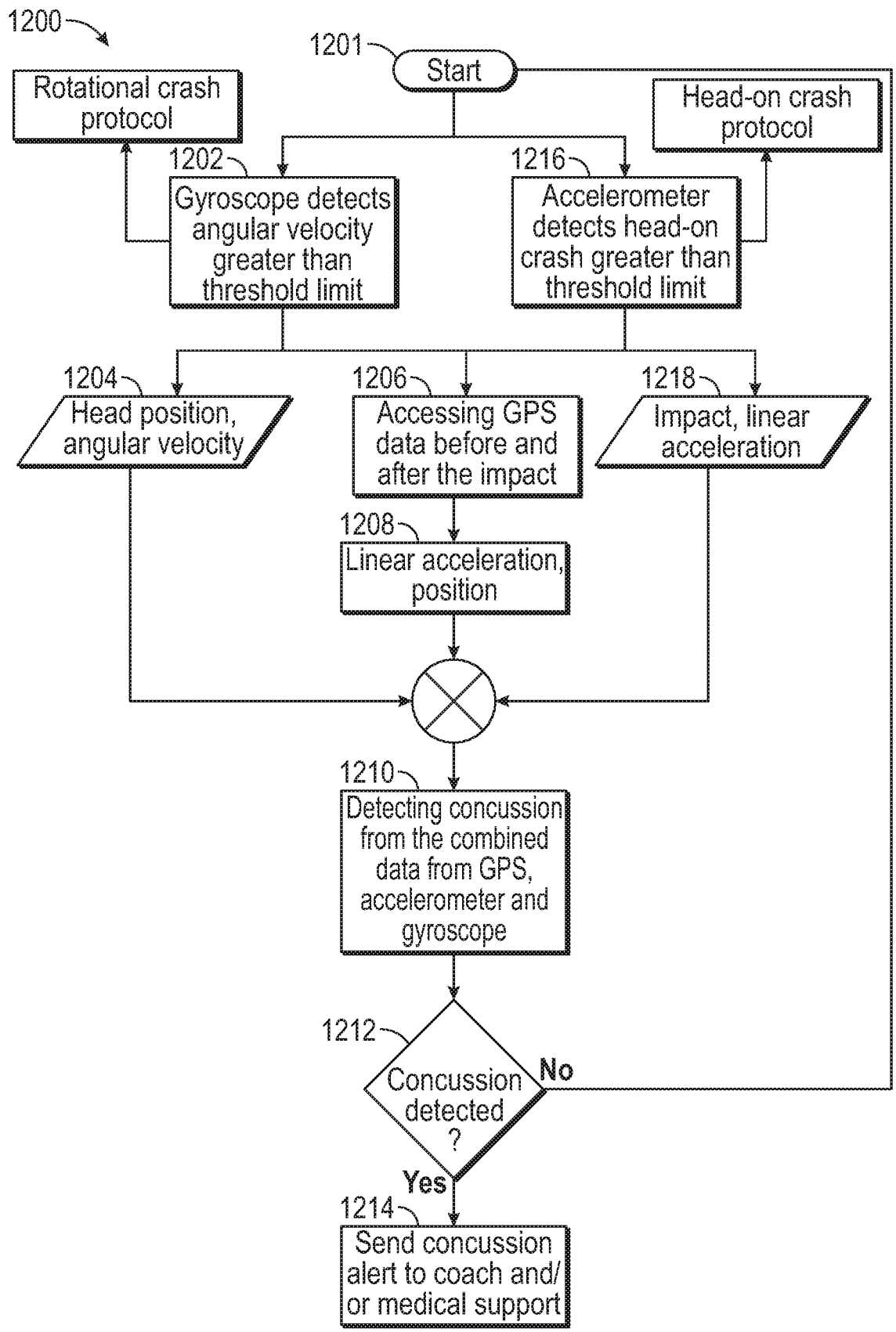
FIG. 12 is a flowchart, depicting the method for concussion detection and/or detection of impact to the head, in accordance with a non-limiting exemplary embodiment of the present disclosure.

Referring to FIG. 12 is a flowchart 1200, depicting the method for concussion detection. The method begins at step 1201, start and then at step 1202 with gyroscope sensor detects angular velocity greater than the threshold limit. Here, it includes a rotational crash protocol. Measuring head position, and angular velocity at step 1204. Accessing GPS data before and after the impact at step 1206. Identifying linear acceleration and position at step 1208. Determining concussion from the combined GPS, accelerometer, and gyroscope sensors at step 1210. It is enquired at step 1212 whether the concussion is detected. If the enquiry to step 1212 is yes, sending concussion alert to the coach and/or medical support at step 1214. If the enquiry to step 1212 is no then the process reverts to step 1201. On the other hand, accelerometer sensor detects head-on crash greater than threshold limit at step 1216. Here, it includes a head-on crash protocol. Identifying impact and linear acceleration at step 1218. Then, the process continues at step 1210.

Figure 13:
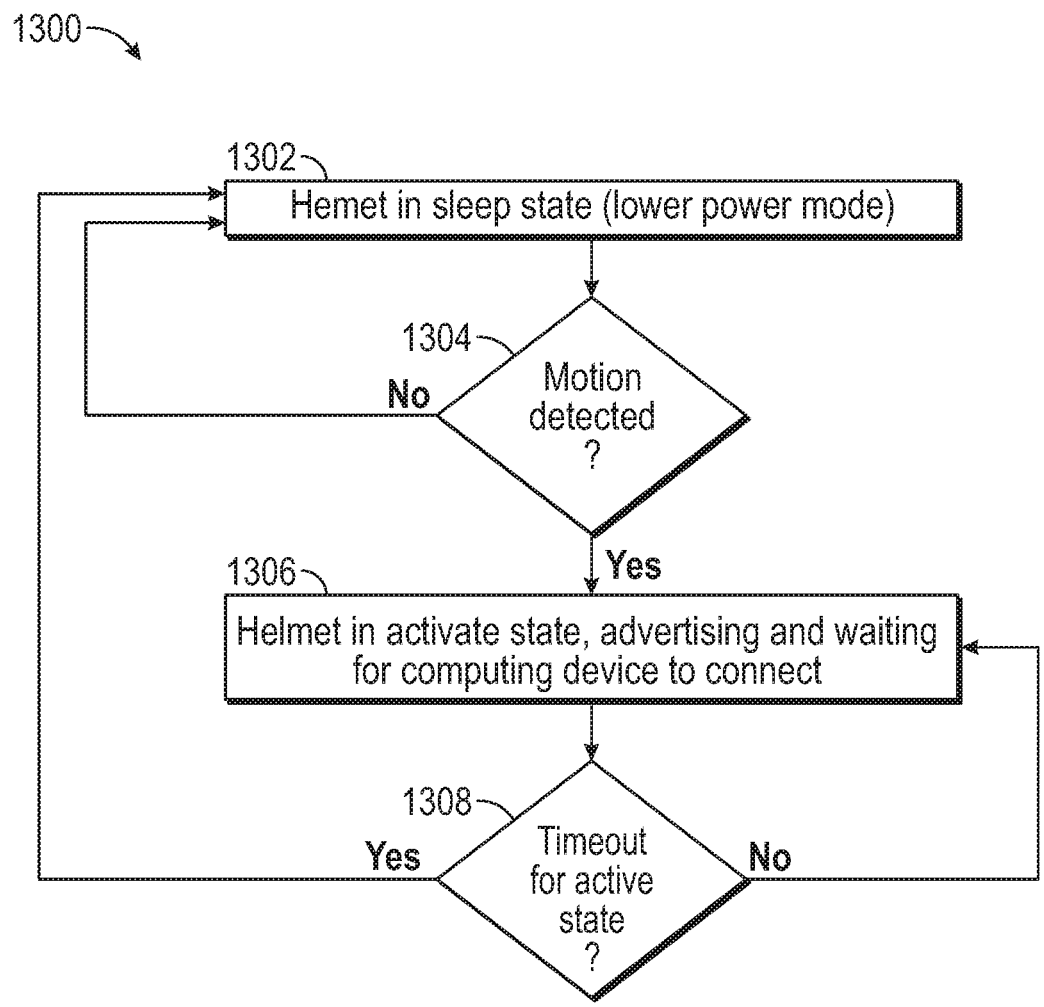
FIG. 13 is flowchart, depicting a method for detecting the motion of the smart helmet in a sleep state and wake up the smart helmet to an active state, in accordance with a non-limiting exemplary embodiment of the present disclosure.
Figure 14:
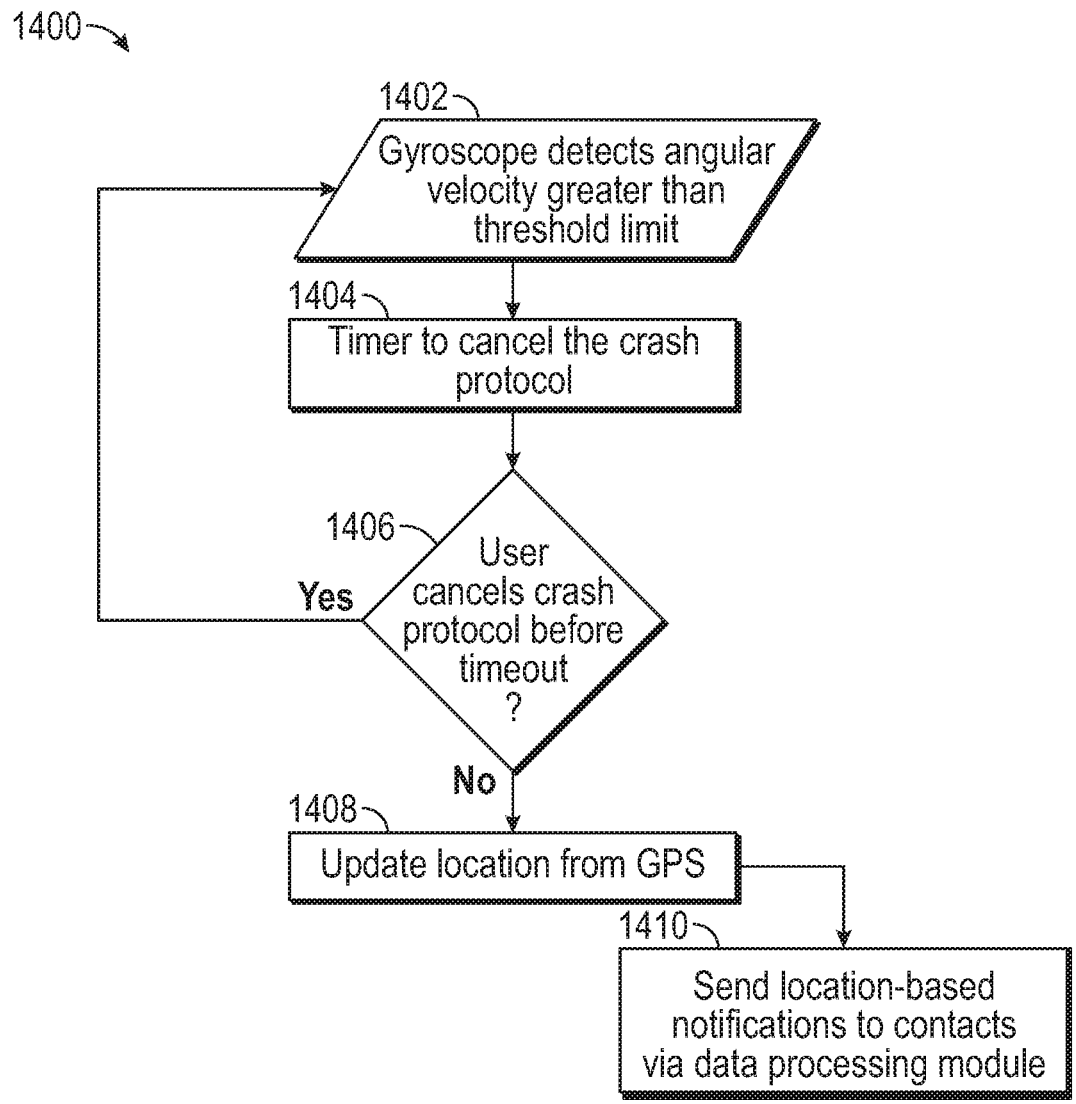
FIG. 14 is flowchart, depicting a method for detecting the rotational head movement during crash, in accordance with a non-limiting exemplary embodiment of the present disclosure.

Referring to FIG. 13, it is flowchart 1300, depicting a method for detecting the motion of the smart helmet in a sleep state and wake up the smart helmet to an active state. The method begins at step 1302 where the helmet is in sleep state (lower power mode). At step 1304, it is enquired whether the motion of helmet is detected. If the enquiry to motion detected to step 1304 is yes, then the helmet gets activated to advertise and waits for computing device to connect at step 1306. If the enquiry to motion detected to step 1304 is no, then it reverts to step 1302. At step 1308, it is enquired whether the timeout for active state of the helmet. If the enquiry to timeout for active state at step 1308 is yes, then the process reverts to step 1302. If the enquiry to timeout for active state at step 1308 is no, then the process reverts to step 1308.

Referring to FIG. 1400, is flowchart 1400, depicting a method for detecting the rotational head movement during crash. The method begins at step 1402 where the gyroscope sensors detects the angular velocity greater than threshold limit. At step 1404, allowing the user to select the timer to cancel the crash protocol. At step 1406, it is enquired whether the user cancelled the crash protocol before time out. If the enquiry to user cancels the crash protocol before timeout to step 1406 is yes, then the process reverts to step 1402. If the enquiry to user cancels the crash protocol before timeout to step 1406 is no, then the location is updated from GPS at step 1408. Sending location-based notifications to the emergency contacts by the data processing module at step 1410.

Figure 15:
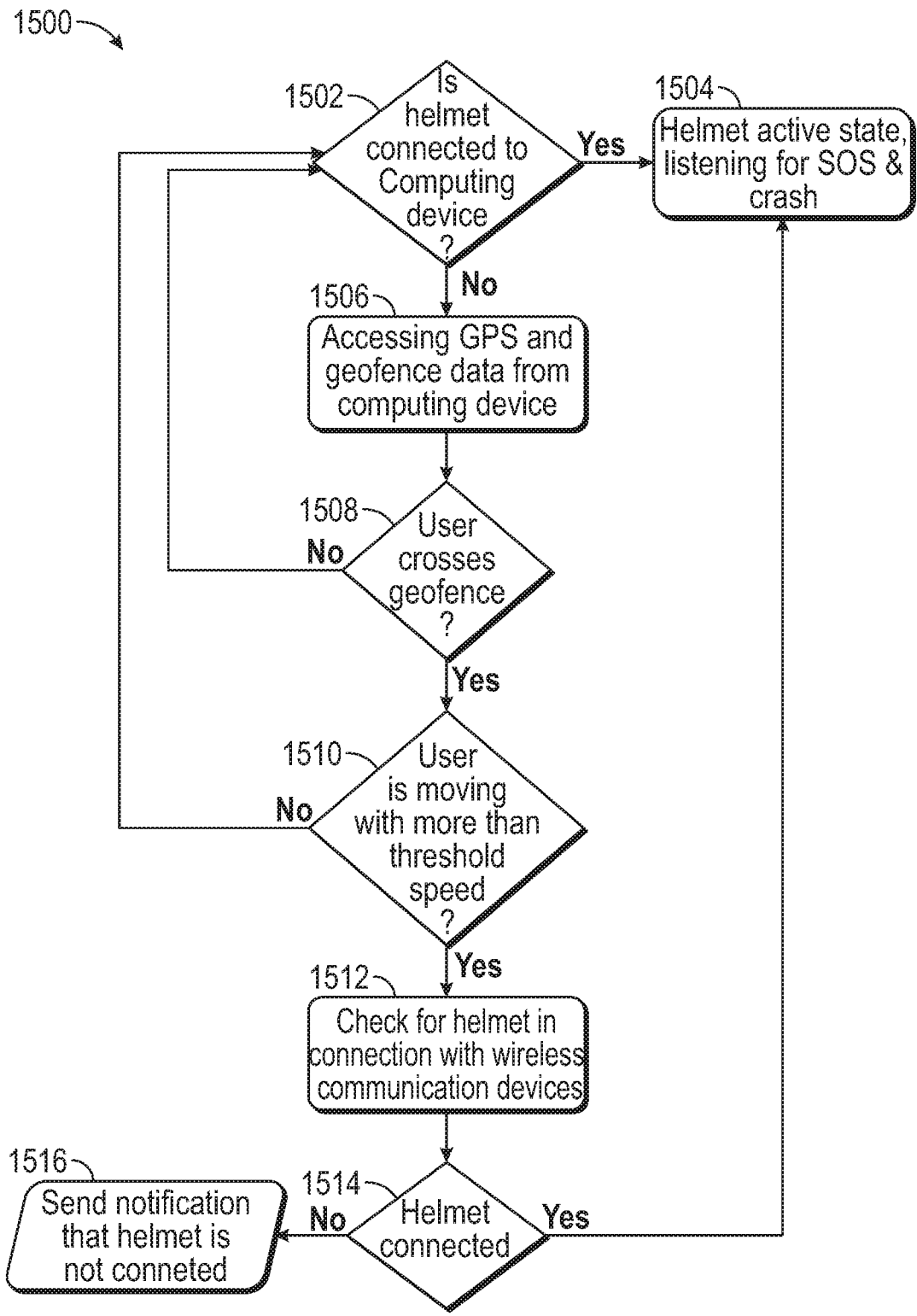
FIG. 15 is flowchart, depicting a method for detecting the ride automatically, in accordance with a non-limiting exemplary embodiment of the present disclosure.

Referring to FIG. 15, it is flowchart 1500, depicting a method for detecting the ride automatically. It is enquired whether the helmet is connected to computing device, at step 1502. If the enquiry to helmet is connected to computing device to step 1502 is yes, then enabling the helmet activate state and listening for SOS, crash at step 1504. If the enquiry to helmet is connected to computing device to step 1502 is no, then accessing GPS and geofence data from the computing device at step 1506. At step 1508, It is enquired whether the user crosses geofence. If the enquiry to user crosses geofence at step 1508 is no, then the process reverts to step 1502. If the enquiry to user crosses geofence at step 1508 is yes, it is further enquired whether the user is moving with more than threshold speed, at step 1510. If the enquiry to user is moving with more than threshold speed at step 1510 is no, then the process reverts to step 1502. If the enquiry to user is moving with more than threshold speed at step 1510 is yes, then checking for helmet in wireless communication devices, at step 1512. At step 1514, It is enquired whether the helmet is connected. If the enquiry to the helmet is connected at step 1514 is yes, then the process reverts to step 1504. If the enquiry to the helmet is connected at step 1514 is no, then sends the notification to the computing device that the helmet is not connected, at step 1516.

Figure 16:
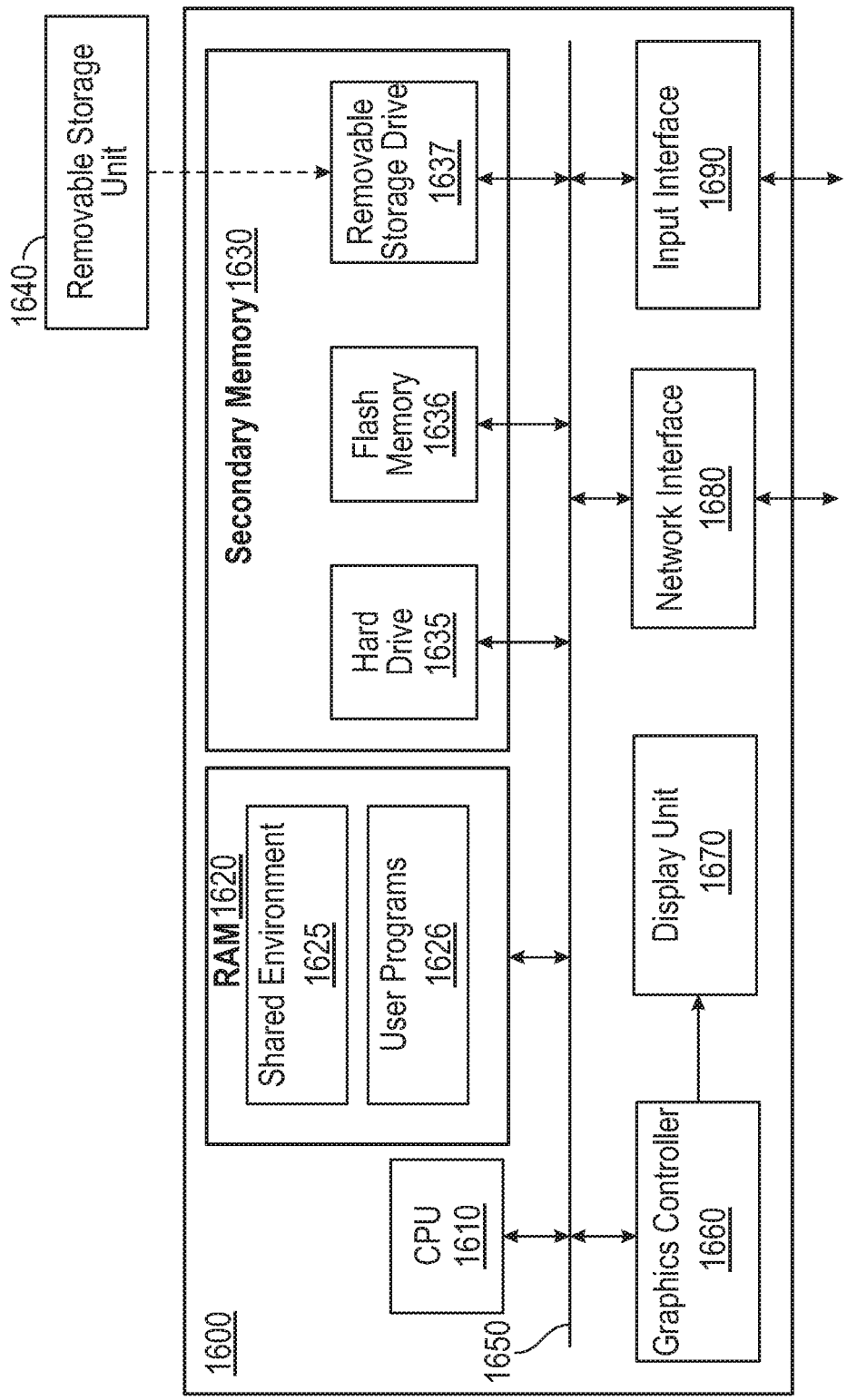
FIG. 16 is a block diagram depicting the details of a Digital Processing System in which various aspects of the present disclosure are operative by execution of appropriate software instructions.

Referring to FIG. 16 is a block diagram 1600 depicting the details of a Digital Processing System 1600 in which various aspects of the present disclosure are operative by execution of appropriate software instructions. The Digital Processing System 1600 may correspond to computing device 303 (or any other system in which the various features disclosed above can be implemented).

Digital Processing System 1600 may contain one or more processors such as a central processing unit (CPU) 1610, Random Access Memory (RAM) 1620, Secondary Memory 1630, Graphics Controller 1660, Display Unit 1670, Network Interface 1680, and Input Interface 1690. All the components except Display Unit 1670 may communicate with each other over Communication Path 1650, which may contain several buses as is well known in the relevant arts. The components of FIG. 16 are described below in further detail.

CPU 1610 may execute instructions stored in RAM 1620 to provide several features of the present disclosure. CPU 1610 may contain multiple processing units, with each processing unit potentially being designed for a specific task. Alternatively, CPU 1610 may contain only a single general-purpose processing unit.

RAM 1620 may receive instructions from Secondary Memory 1630 using Communication Path 1650. RAM 1620 is shown currently containing software instructions, such as those used in threads and stacks, constituting Shared Environment 1625 and/or User Programs 1626. Shared Environment 1625 includes operating systems, device drivers, virtual machines, machine language, etc., which provide a (common) run time environment for execution of User Programs 1626.

Graphics Controller 1660 generates display signals (e.g., in RGB format) to Display Unit 1670 based on data/instructions received from CPU 1610. Display Unit 1670 contains a display screen to display the images defined by the display signals. Input Interface 1690 may correspond to a keyboard and a pointing device (e.g., touch-pad, mouse) and may be used to provide inputs. Network Interface 1680 provides connectivity to a network (e.g., using Internet Protocol), and may be used to communicate with other systems (such as those shown in FIG. 3, network 305) connected to the network.

Secondary Memory 1630 may contain Hard Drive 1635, Flash Memory 1636, and Removable Storage Drive 1637. Secondary Memory 1630 may store the data software instructions (e.g., for performing the actions noted above with respect to the Figures), which enable Digital Processing System 1600 to provide several features in accordance with the present disclosure.

Some or all of the data and instructions may be provided on Removable Storage Unit 1640, and the data and instructions may be read and provided by removable storage drive 1637 to CPU 1610. Floppy drive, magnetic tape drive, CD-ROM drive, DVD Drive, Flash memory, removable memory chip (PCMCIA Card, EEPROM) are examples of such removable storage drive 1637.

Removable storage unit 1640 may be implemented using medium and storage format compatible with removable storage drive 1637 such that removable storage drive 1637 can read the data and instructions. Thus, removable storage unit 1640 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 1640 or hard disk installed in hard drive 1635. These computer program products are means for providing software to digital processing system 1600. CPU 1610 may retrieve the software instructions, and execute the instructions to provide various features of the present disclosure described above.

The term "storage media/medium" as used herein refers to any non-transitory media that store data and/or instructions that cause a machine language to operate in a specific fashion. Such storage media may comprise non-volatile media and/or volatile media. Non-volatile media includes, for example, optical disks, magnetic disks, or solid-state drives, such as storage memory 1630. Volatile media includes dynamic memory, such as RAM 1620. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus (communication path) 1650. Transmission media can also take the form of acoustic or light waves, such as those generated during radio-wave and infra-red data communications.

Reference throughout this specification to "one embodiment", "an embodiment", or similar or any Machine language means that a particular feature, structure, or characteristic described in connection with the embodiment is included in at least one embodiment of the present disclosure. Thus, appearances of the phrases "in one embodiment", "in an embodiment" and similar or any Machine language throughout this specification may, but do not necessarily, all refer to the same embodiment.

Furthermore, the described features, structures, or characteristics of the disclosure may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the disclosure.

In different embodiments, the helmet system is integrated with artificial intelligence (AI), wherein the AI integrated helmet systems can detect various situations and react/adapt accordingly in an intelligent manner.

In different embodiments, the helmet system is configured to collect data and correlate and compute it with the mobile applications such as maps in the user's computing device to provide real time traffic and weather data for various purposes.

Although the present disclosure has been described in terms of certain preferred embodiments and illustrations thereof, other embodiments and modifications to preferred embodiments may be possible that are within the principles and spirit of the invention. The above descriptions and figures are therefore to be regarded as illustrative and not restrictive.

Thus the scope of the present disclosure is defined by the appended claims and includes both combinations and sub combinations of the various features described herein above as well as variations and modifications thereof, which would occur to persons skilled in the art upon reading the foregoing description.

I claim:

1. An integrated smart helmet system, comprising:
a control unit-printed circuit board (PCB) is wirelessly connected to a computing device over a network, whereby the computing device is configured to enable a user to use different functionalities without having to remove a smart helmet and access the computing device and the control unit-PCB is configured to detect crashes while wearing the smart helmet by the user and notify the crash detected information to the computing device over the network; and
buttons are positioned at the rear or on the side of the smart helmet and the control unit-PCB is electrically coupled to the buttons, the buttons are configured to initiate prompts to direct the user to put away the computing device while driving and also disable certain dangerous functions, the control unit-PCB is electrically coupled to ultrasonic sensors placed at blind spot detection angles and the ultrasonic sensors are configured to scan and report objects in a user's blind spot.

2. The integrated smart helmet system of claim 1, wherein the control unit-PCB comprises a wireless communication device configured to transmit and receive information via the network.

3. The integrated smart helmet system of claim 1, wherein the control unit-PCB is electrically coupled to a microphone configured to record a SOS signal.

4. The integrated smart helmet system of claim 1, wherein the control unit-PCB is electrically coupled to at least two front LED indicators, and at least one rear LED indicator is configured to direct the user to put away the computing device while driving and also disable certain dangerous functions.

5. The integrated smart helmet system of claim 1, wherein the smart helmet comprising a paired remote button via an RF chip circuit, and a battery which can be placed on a handle bar.

6. The integrated smart helmet system of claim 1, wherein the computing device comprises a data processing module configured to compute and store data from the smart helmet by leveraging the processing power of the computing device.

7. A method, comprising:
activating a smart helmet;
pairing the smart helmet with a computing device of a user;
commencing a ride by the user;
detecting head-on crash greater than a threshold limit by an accelerometer;
authenticating data readings from the accelerometer and motion detection from GPS location after the impact and then enquire whether there is a detected motion is a passive crash or an active crash;
cross referencing accelerometer data readings with a data processing module at the computing device and-checks whether the user is in motion by referring to a gyroscope sensor and then updating the GPS live location when the user doesn't cancel the crash protocol before timeout;

if it is the active crash, sending the location-based notifications to emergency contacts via the data processing module; and if it is the passive crash, sending the notification to the user that the smart helmet was dropped when the user doesn't cancel the crash protocol before timeout, a control unit-printed circuit board (PCB) is electrically coupled to ultrasonic sensors placed at blind spot detection angles and the ultrasonic sensors are configured to scan and report objects in a user's blind spot.

8. The method of claim 7, comprising concussion detection includes steps detecting angular velocity greater than the threshold limit by the gyroscope sensor; measuring head position, and angular velocity; accessing GPS data before and after the impact; identifying linear acceleration and position; determining concussion from the combined GPS, the accelerometer, and the gyroscope sensor; sending concussion alert to the coach and/or medical support; and detecting head-on crash greater than threshold limit by the accelerometer and identifying impact and linear acceleration.

9. The method of claim 7, comprising rotational head movement detection includes steps during crash includes detecting angular velocity greater than threshold limit by the gyroscope sensor; allowing the user to select the timer to cancel the crash protocol and sending notifications to the emergency contacts by the data processing module.

10. The method of claim 7, comprising ride detection includes steps enabling the smart helmet to activate state and listens for SOS; accessing GPS and Geofence data from the computing device; checking for the smart helmet in connection with a wireless communication device; and sending the notifications to the computing device that the smart helmet is not connected.

* * * * *